(12) United States Patent
Woo

(10) Patent No.: US 11,929,564 B2
(45) Date of Patent: Mar. 12, 2024

(54) ELECTRONIC DEVICE COMPRISING 5G ANTENNA

(71) Applicant: LG ELECTRONICS INC., Seoul (KR)

(72) Inventor: Seungmin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 138 days.

(21) Appl. No.: 17/773,008

(22) PCT Filed: Oct. 30, 2019

(86) PCT No.: PCT/KR2019/014421
§ 371 (c)(1),
(2) Date: Apr. 28, 2022

(87) PCT Pub. No.: WO2021/085669
PCT Pub. Date: May 6, 2021

(65) Prior Publication Data
US 2022/0407233 A1    Dec. 22, 2022

(51) Int. Cl.
*H01Q 9/06* (2006.01)
*H01Q 1/24* (2006.01)
(Continued)

(52) U.S. Cl.
CPC ............. *H01Q 9/065* (2013.01); *H01Q 1/243* (2013.01); *H01Q 1/48* (2013.01); *H01Q 5/385* (2015.01);
(Continued)

(58) Field of Classification Search
CPC .......... H01Q 9/065; H01Q 1/243; H01Q 1/48; H01Q 5/385; H01Q 21/062; H01Q 23/00;
(Continued)

(56) References Cited

U.S. PATENT DOCUMENTS

2003/0103006 A1* 6/2003 Yamada ................... H01Q 1/38
343/700 MS
2008/0316118 A1   12/2008 Puente Baliarda et al.
(Continued)

FOREIGN PATENT DOCUMENTS

CN    103703620    4/2014
CN    107046183    8/2017
(Continued)

OTHER PUBLICATIONS

The State Intellectual Property Office of the People's Republic of China Application Serial No. 202010236799.X, Office Action dated Dec. 7, 2023, 6 pages.
(Continued)

*Primary Examiner* — Fitwi Y Hailegiorgis
(74) *Attorney, Agent, or Firm* — LEE, HONG, DEGERMAN, KANG & WAIMEY

(57) ABSTRACT

Provided is an electronic device comprising an antenna for 5G communication according to the present invention. The electronic device comprises an array antenna which is implemented as a multi-layer substrate inside the electronic device and includes multiple antenna elements. Each of the multiple antenna elements of the array antenna may comprise: a patch antenna disposed on a specific layer of the multi-layer substrate and including a first patch and a second patch which are spaced a predetermined distance apart from each other; and a ground layer disposed under the patch antenna and having a slot. Meanwhile, the first patch and the second patch may be connected to the ground layer through multiple vias, and the multiple vias may be arranged in the longitudinal direction of the slot while being adjacent to the slot.

20 Claims, 25 Drawing Sheets

(51) Int. Cl.
  *H01Q 1/48* (2006.01)
  *H01Q 5/385* (2015.01)
  *H01Q 21/06* (2006.01)
  *H01Q 23/00* (2006.01)
  *H04B 1/40* (2015.01)
  *H04B 7/0413* (2017.01)
  *H04B 7/06* (2006.01)

(52) U.S. Cl.
  CPC ........... *H01Q 21/062* (2013.01); *H01Q 23/00* (2013.01); *H04B 1/40* (2013.01); *H04B 7/0413* (2013.01); *H04B 7/0617* (2013.01)

(58) Field of Classification Search
  CPC .... H01Q 1/526; H01Q 9/0457; H01Q 21/065; H01Q 21/28; H01Q 21/00; H01Q 1/36; H01Q 9/0407; H04B 1/40; H04B 7/0413; H04B 7/0617; H04B 7/06
  USPC ........................................................ 375/219
  See application file for complete search history.

(56) References Cited

U.S. PATENT DOCUMENTS

| | | | |
|---|---|---|---|
| 2011/0057853 | A1 | 3/2011 | Kim et al. |
| 2011/0068995 | A1 | 3/2011 | Baliarda et al. |
| 2021/0234269 | A1* | 7/2021 | Vilenskiy ................. H01Q 3/36 |

FOREIGN PATENT DOCUMENTS

| | | |
|---|---|---|
| CN | 110021815 | 7/2019 |
| CN | 110048224 | 7/2019 |
| JP | 2007158555 | 6/2007 |
| KR | 20110026654 | 3/2011 |
| KR | 20190120135 | 10/2019 |

OTHER PUBLICATIONS

Kioumars Pedram et al., "Evolution and Move toward Fifth-Generation Antenna" The Fifth Generation (5G) of Wireless Communication, IntechOpen [Online], Nov. 5, 2018, 21 pages.

PCT International Application No. PCT/KR2019/014421, International Search Report dated Aug. 27, 2020, 4 pages.

* cited by examiner (a)

(b)

ELECTRONIC DEVICE COMPRISING 5G ANTENNA

CROSS-REFERENCE TO RELATED APPLICATIONS

This application is the National Stage filing under 35 U.S.C. 371 of International Application No. PCT/KR2019/014421, filed on Oct. 30, 2019, the contents of which are all incorporated by reference herein in their entirety.

TECHNICAL FIELD

The present disclosure relates to an electronic device having a 5G antenna. One particular implementation relates to an electronic device having a 5G array antenna operating in a millimeter wave band.

BACKGROUND ART

Electronic devices may be divided into mobile/portable terminals and stationary terminals according to mobility. Also, the electronic device may be classified into handheld types and vehicle mount types according to whether or not a user can directly carry.

Functions of electronic devices are diversified. Examples of such functions include data and voice communications, capturing images and video via a camera, recording audio, playing music files via a speaker system, and displaying images and video on a display. Some terminals include additional electronic game play functions or perform a multimedia player function. Specifically, in recent years, mobile terminals can receive broadcast and multicast signals to allow viewing of video or television programs.

As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. Also, it is expected that in the future, wireless communication systems using 5G communication technology will be commercialized to provide a variety of services. Meanwhile, some of LTE frequency bands may be allocated to provide 5G communication services.

In this regard, the electronic device may be configured to provide 5G communication services in various frequency bands. Recently, attempts have been made to provide 5G communication services using a Sub-6 band below a 6 GHz band. In the future, it is also expected to provide 5G communication services by using a millimeter wave (mmWave) band in addition to the Sub-6 band for faster data rate.

Meanwhile, a 28 GHz band, a 39 GHz band, and a 64 GHz band are being considered as frequency bands to be allocated for 5G communication services in such a mmWave band. In this regard, a plurality of array antennas in the millimeter wave band may be disposed in the electronic device.

Meanwhile, in addition to the plurality of array antennas, a plurality of other antennas may be disposed in the electronic device. Therefore, it is necessary to radiate a signal to an outside of the electronic device while preventing interference with the plurality of existing antennas.

In this regard, a 5G antenna disposed inside the electronic device may be fabricated in a printed form on a planar substrate. Such an antenna printed on a planar substrate radiates a signal in a direction perpendicular to the substrate. Accordingly, there is a problem in that the signal radiated from the 5G antenna disposed inside the electronic device may be blocked by a display region or a metal body of the electronic device.

In particular, a millimeter wave band such as a 64 GHz band may be allocated for 5G/6G communication services. An antenna operating in such a 64 GHz band needs to operate particularly in a broadband. In addition, antennas operating in other mmWave bands also need to operate in a broadband for high-speed communication. However, the antenna printed on the planar substrate has a problem in that bandwidth characteristics are limited due to the planar structure.

DISCLOSURE OF INVENTION

Technical Problem

An aspect of the present disclosure is to solve the above-mentioned problems and other problems. Furthermore, another aspect of the present disclosure is to improve the radiation performance of a 5G antenna in an electronic device having a 5G/6G antenna operating in a millimeter wave band.

Another aspect of the present disclosure is to achieve the broadband characteristics of a 5G antenna in the electronic device having the 5G/6G antenna operating in a millimeter wave band.

Still another aspect of the present disclosure is to radiate a signal to an outside of the electronic device through a non-metal region through the antenna in the electronic device having the 5G/6G antenna operating in a millimeter wave band.

Solution to Problem

In order to achieve the foregoing or other objectives, an electronic device having an antenna for 5G communication according to the present disclosure is provided. The electronic device may include an array antenna implemented as a multi-layer substrate inside the electronic device, the array antenna including a plurality of antenna elements. Each antenna element of the plurality of array antennas may include a patch antenna disposed on a specific layer of the multi-layer substrate, the patch antenna including a first patch and a second patch spaced apart from each other by a predetermined spacing, and a patch antenna disposed on a specific layer of the multi-layer substrate, the patch antenna including a first patch and a second patch spaced apart from each other by a predetermined spacing, and a ground layer disposed under the patch antenna, the ground layer having a slot. On the other hand, the first patch and the second patch may be connected to the ground layer through a plurality of vias, and the plurality of vias may be disposed in a length direction of the slot to be adjacent to the slot.

According to an embodiment, the electronic device may further include a transceiver circuit that controls a signal applied to each antenna element of the array antenna to perform beamforming through the array antenna.

According to an embodiment, each of the antenna elements may operate as a magnetic dipole type slot antenna by a magnetic field formed in a second slot between the first patch and the second patch in a first frequency band. Furthermore, the each of the antenna elements may operate as an electric dipole type patch antenna by the first patch and the second patch in a second frequency band different from the first frequency band.

According to an embodiment, the plurality of vias may include a plurality of first vias disposed at predetermined intervals on one side surface of the first patch to connect the one side surface of the first patch and the ground layer. Furthermore, the plurality of vias may further include a plurality of second vias disposed at predetermined intervals on one side surface of the first patch to connect the ground layer and the other side surface of the second patch facing the one side surface of the first patch.

According to an embodiment, the electronic device may further include a feeding line disposed under the ground layer, and configured to transmit a signal to the patch antenna through the slot. In this case, a first signal of a first frequency band may form a magnetic field through a second slot between the first patch and the second patch through the feeding line and the plurality of vias. Meanwhile, a second signal of a second frequency band may be coupled to the patch antenna through the feeding line and the slot to form an electric field on the patch antenna.

According to an embodiment, a radio frequency integrated chip (RFIC), which is the transceiver circuit, may be connected to the feeding line in the form of bumping under the feeding line to transmit a millimeter wave band signal between the RFIC and the feeding line.

According to an embodiment, the ed the ed may further include a parasitic patch disposed on a substrate above the patch antenna to extend an operating bandwidth of the antenna element. In this case, as the center of the parasitic patch is offset compared to the center of the patch antenna, a beam peak of the antenna element may be tilted by a first angle from the boresight.

According to an embodiment, the electronic device may further include a second parasitic patch disposed above the parasitic patch to further extend the operating bandwidth of the antenna element. In this case, as the center of the second parasitic patch is offset compared to the center of the parasitic patch, the beam peak of the antenna element may be tilted by a second angle greater than the first angle from the boresight.

According to an embodiment, the multi-layer substrate may be disposed inside a body of the electronic device. Meanwhile, the body may include a metal region defined at a side surface portion of the electronic device, and disposed to disallow a signal radiated from the antenna element to pass therethrough, and an un-transparent region defined at a front or rear surface portion of the electronic device to disallow a signal radiated from the antenna element to pass therethrough. Meanwhile, the multi-layer substrate may include a dielectric region defined between the side metal region and the un-transparent region and disposed to allow a signal radiated from the antenna element to pass therethrough.

According to an embodiment, the array antenna may be configured as a one-dimensional array antenna such that a predetermined number of antenna elements are disposed in one axial direction to perform beamforming in the one axial direction. Accordingly, a beam-formed signal may be radiated from the array antenna to the outside through a curved dielectric region defined in the body of the electronic device.

According to an embodiment, the array antenna may be configured as a two-dimensional array antenna in which a predetermined number of antenna elements are disposed in one axial direction and a predetermined number of antenna elements are disposed in the other axial direction. Meanwhile, a beam-formed signal may be radiated from the array antenna to the outside through a curved second dielectric region defined in the body of the electronic device. Meanwhile, a width of the second dielectric region is disposed to be narrower than that of the dielectric region due to the directivity of the two-dimensional array antenna in the other axial direction.

According to an embodiment, the patch antenna may include first to fourth patches spaced apart in one axial direction and the other axial direction. Meanwhile, the ground layer may have an orthogonal slot disposed to be orthogonal to the one axial direction and the other axial direction. As an example, the plurality of vias may be disposed along vertical and horizontal side surfaces in each of the first to fourth patches adjacent to the orthogonal slot such that each of the antenna elements forms a dual polarization.

According to an embodiment, the electronic device may further include a first feeding line disposed in parallel to a vertical slot of the orthogonal slot under the ground, and a second feeding line disposed in parallel to a horizontal slot of the orthogonal slot under the ground. Accordingly, the each of the antenna elements may generate a vertically polarized signal by a first signal from the first feeding line. Furthermore, the each of the antenna elements may generate a horizontally polarized signal by a second signal from the second feeding line.

According to an embodiment, the array antenna may be configured as a two-dimensional array antenna in which a predetermined number of antenna elements are disposed in one axial direction and a predetermined number of antenna elements are disposed in the other axial direction. Meanwhile, a direction of the slot may be defined in the same direction for all antenna elements. Furthermore, a plurality of electric band gap (EBG) structures may be periodically disposed on the ground and a substrate on which the patch antenna is disposed in the multi-layer substrate in a length direction of the slot so as to improve the efficiency of the array antenna.

According to an embodiment, the plurality of EBG structures may be disposed in a one-dimensional structure on both side surfaces of the multi-layer substrate in a structure ground-connected to the substrate on which the patch antenna is disposed. Meanwhile, a plurality of EBG vias, which are connection structures disposed on the EBG structures, may be arranged in parallel to the plurality of vias arranged in the patch antenna to improve antenna efficiency.

According to an embodiment, the electronic device may further include a baseband processor connected to the transceiver circuit and configured to control the transceiver circuit so as to perform beamforming and multi-input multi-output (MIMO) through a plurality of array antennas disposed at different positions of the electronic device. Meanwhile, the baseband processor may perform beamforming in different directions to radiate signals to dielectric regions defined in different directions through a first array antenna and a second array antenna among the plurality of array antennas. As a result, it may be possible to improve an isolation between a plurality of MIMO streams.

An electronic device having an antenna according to another aspect of the present disclosure is provided. The electronic device may include an array antenna implemented as a multi-layer substrate inside the electronic device, the array antenna including a plurality of antenna elements, a case constituting a body of the electronic device and having a dielectric region to allow a signal through the array antenna to be radiated to the outside, and a processor that controls a signal applied to each antenna element of the array antenna to perform beamforming through the array antenna.

According to an embodiment, each of the antenna elements may include a patch antenna disposed on a specific layer of the multi-layer substrate, the patch antenna comprising a first patch and a second patch spaced apart from each other by a predetermined spacing, and a ground layer disposed under the patch antenna, the ground layer having a slot. Meanwhile, the first patch and the second patch may be connected to the ground layer through a plurality of vias, and the plurality of vias are disposed in a length direction of the slot to be adjacent to the slot.

Advantageous Effects of Invention

An aspect of the present disclosure is to improve the radiation performance of a 5G antenna through the antenna with a multi-layer substrate structure, a via in a slot region, and an EBG structure in an electronic device having a 5G/6G antenna operating in a millimeter wave band.

Furthermore, another aspect of the present disclosure is to achieve the broadband characteristics of a 5G antenna by having the characteristics of both a slot antenna and a patch antenna using vias in the electronic device having the 5G/6G antenna operating in a millimeter wave band.

Still another aspect of the present disclosure is to radiate a signal to an outside of the electronic device through a non-metal region through an antenna by adjusting the position of a parasitic patch in the electronic device having the 5G/6G antenna operating in a millimeter wave band.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

MODE FOR THE INVENTION

Figure 1A:
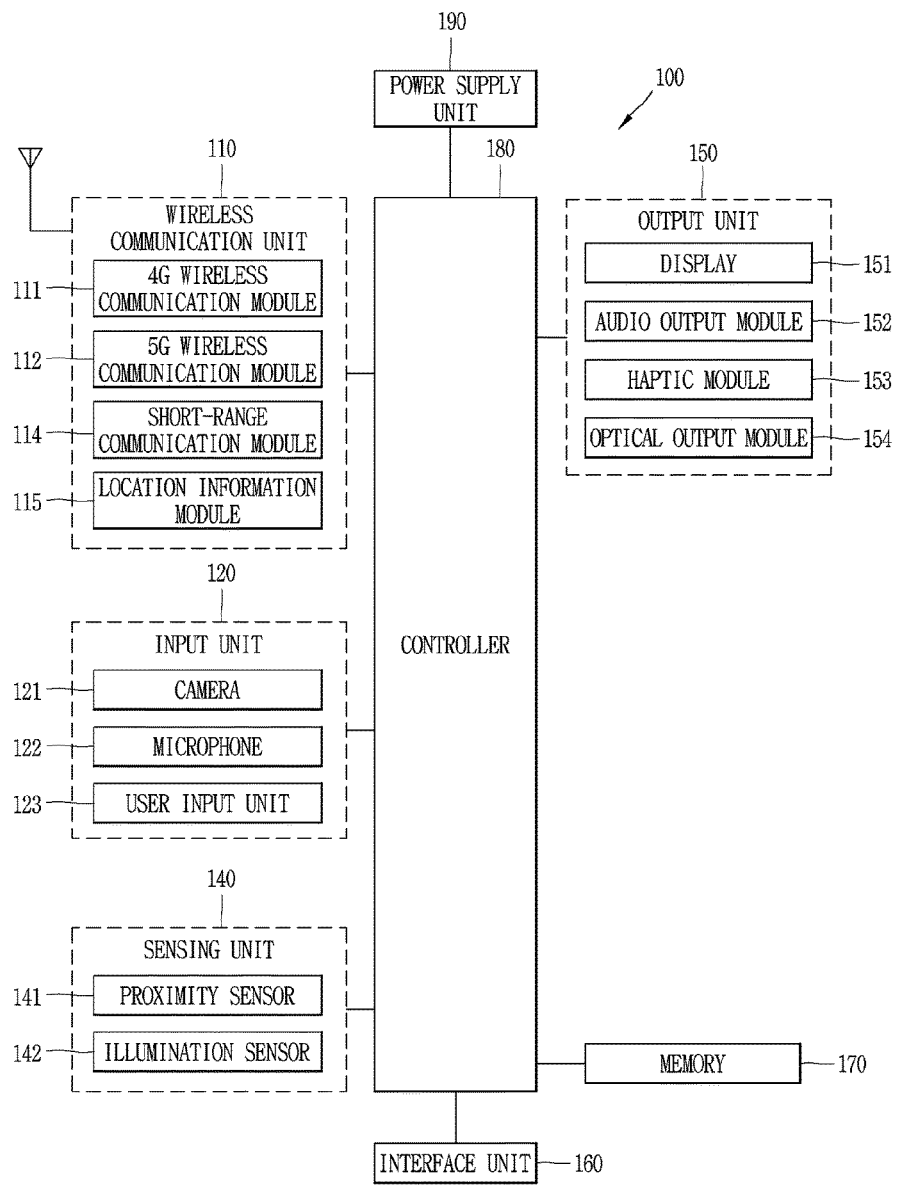
FIG. 1A is a block diagram of an electronic device in accordance with one exemplary implementation of the present disclosure.

Hereinafter, preferred embodiments of the present disclosure will be described in detail with reference to the accompanying drawings, and the same or similar elements are designated with the same numeral references regardless of the numerals in the drawings and redundant description thereof will be omitted. In general, a suffix such as "module" and "unit" may be used to refer to elements or components. Use of such a suffix herein is merely intended to facilitate description of the specification, and the suffix itself is not intended to give any special meaning or function. In describing the present disclosure, moreover, the detailed description will be omitted when a specific description for publicly known technologies to which the invention pertains is judged to obscure the gist of the present disclosure. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals.

Figure 1B:
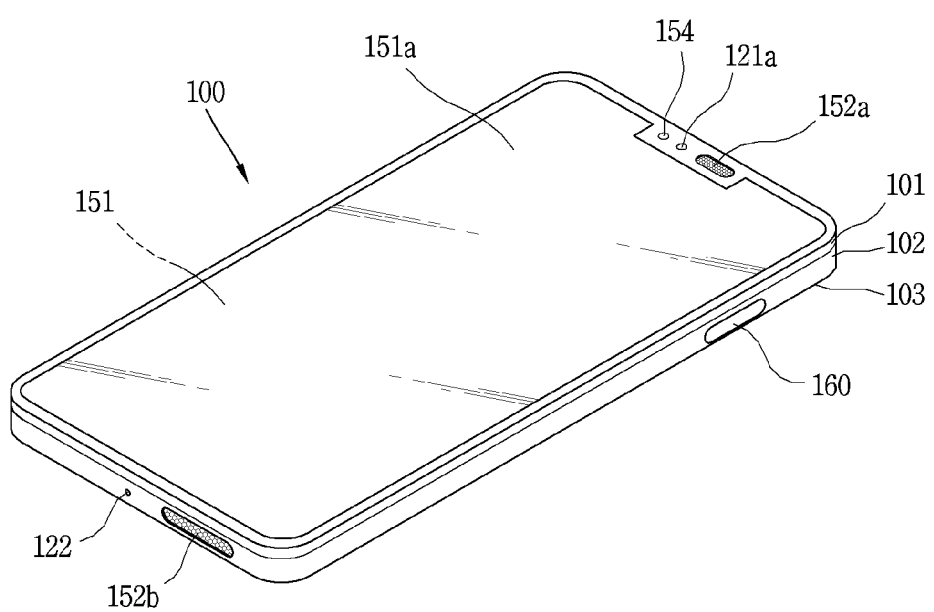
FIGS. 1B and 1C are conceptual views illustrating one example of an electronic device, viewed from different directions.
Figure 1C:
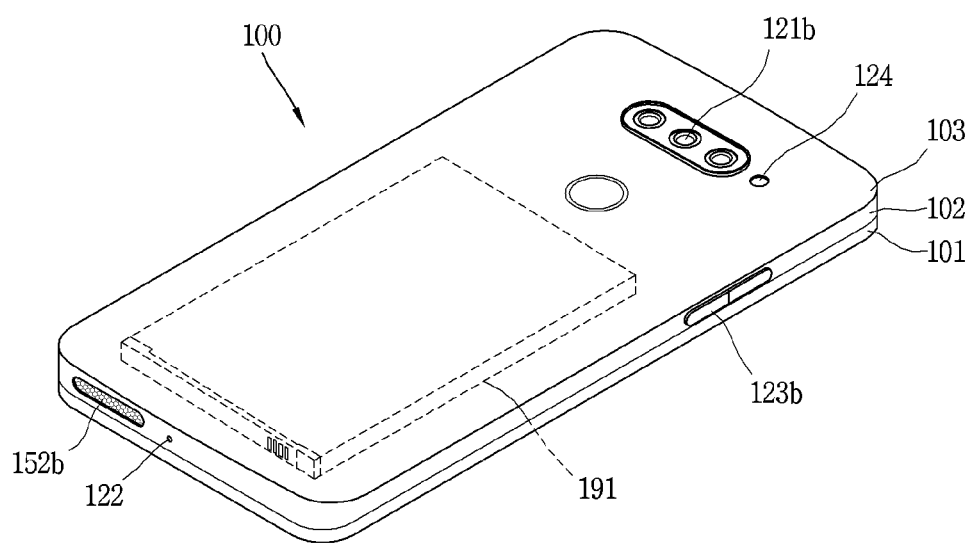

Referring to FIGS. 1A to 1C, FIG. 1A is a block diagram of an electronic device in accordance with one exemplary implementation of the present disclosure, and FIGS. 1B and 1C are conceptual views illustrating one example of an electronic device, viewed from different directions.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement. Greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be, for instance, a 4G communication network and a 5G communication network.

The wireless communication unit 110 may include at least one of a 4G wireless communication module 111, a 5G wireless communication module 112, a short-range communication module 113, a location information module 114 and the like.

The 4G wireless communication module 111 may transmit and receive 4G signals to and from 4G base stations through a 4G mobile communication network. At this time, the 4G wireless communication module 111 may transmit one or more 4G transmission signals to the 4G base station. Furthermore, the 4G wireless communication module 111 may receive one or more 4G reception signals from the 4G base station.

In this regard, up-link (UL) multi-input multi-output (MIMO) may be performed by a plurality of 4G transmission signals transmitted to the 4G base station. Furthermore, down-link (DL) multi-input multi-output (MIMO) may be performed by a plurality of 4G reception signals received from the 4G base station.

The 5G wireless communication module 112 may transmit and receive 5G signals to and from 5G base stations through a 5G mobile communication network. Here, the 4G base station and the 5G base station may have a non-stand-alone (NSA) structure. For instance, the 4G base station and the 5G base station may have a co-located structure disposed at the same location within a cell. Alternatively, the 5G base station may be deployed in a stand-alone (SA) structure at a separate location from the 4G base station.

The 5G wireless communication module 112 may transmit and receive 5G signals to and from 5G base stations through a 5G mobile communication network. At this time, the 5G wireless communication module 112 may transmit one or more 5G transmission signals to the 5G base station. Furthermore, the 5G wireless communication module 112 may receive one or more 5G reception signals from the 5G base station.

In this case, a 5G frequency band may use the same band as a 4G frequency band, and it may be referred to as LTE re-farming. Meanwhile, a Sub-6 frequency band, which is a range of 6 GHz or less, may be used as the 5G frequency band.

On the contrary, a millimeter wave (mmWave) band may be used as a 5G frequency band to perform broadband high-speed communication. When the mmWave band is used, the electronic device 100 may perform beamforming for communication coverage expansion with a base station.

Meanwhile, regardless of the 5G frequency band, in a 5G communication system, a larger number of multi-input multi-output (MIMO) may be supported to improve transmission speed. In this regard, up-ink (UL) MIMO may be performed by a plurality of 5G transmission signals transmitted to the 5G base station. Furthermore, down-link (DL) MIMO may be performed by a plurality of 5G reception signals received from the 5G base station.

Meanwhile, the wireless communication unit 110 may be in a dual connectivity (DC) state with a 4G base station and a 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, when the 4G base station and the 5G base station have a co-located structure, it is possible to improve throughput through inter-CA (Carrier Aggregation). Therefore, in an EN-DC state with the 4G base station and the 5G base station, 4G reception signals and 5G reception signals may be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 113 in general supports wireless communications between the electronic device 100 and a wireless communication system, communications between the electronic device 100 and another electronic device, or communications between the electronic device and a network where another electronic device (or an external server) is located, via wireless area networks. The short-range communication module denotes a module for short-range communications.

Meanwhile, short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission speed improvement and communication system convergence, carrier aggregation (CA) using at least one of the 4G wireless communication module 111 and 5G wireless communication module 112 and the Wi-Fi communication module 113. In this regard, 4G+WiFi carrier aggregation (CA) may be performed using the 4G wireless communication module 111 and the Wi-Fi communication module 113. Alternatively, 5G+WiFi carrier aggregation (CA) may be performed using the 5G wireless communication module 112 and the Wi-Fi communication module 113.

The location information module 114 is a module for acquiring a location (or current location) of an electronic device, and a representative example thereof includes a Global Positioning System (GPS) module or a Wireless Fidelity (WiFi) module. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) of the electronic device and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensor unit 140 may typically be implemented using one or more sensors configured to sense internal information of the electronic device, the surrounding environment of the electronic device, user information, and the like. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The electronic device disclosed herein may be configured to utilize information obtained from one or more sensors, and combinations thereof.

The output unit 150 may be configured to output an audio signal, a video signal or a tactile signal. The output unit 150 may include a display module 151, an audio output module 152, a haptic module 153, an optical output unit 154 and the like. The display module 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of those application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The controller 180 may provide or process information or functions appropriate for a user in a manner of processing signals, data, information and the like, which are input or output by the aforementioned components, or activating the application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100, under the control of the controller 180. The power supply unit 190 may include a battery, and the battery may be configured to be embedded in the terminal body, or configured to be detachable from the terminal body.

At least part of the components may cooperatively operate to implement an operation, a control or a control method of an electronic device according to various implementations disclosed herein. Also, the operation, the control or the control method of the electronic device may be implemented on the electronic device by an activation of at least one application program stored in the memory 170.

Referring to FIGS. 1B and 1C, the disclosed electronic device 100 includes a bar-like terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this implementation, the electronic device 100 may include a front case 101 and a rear case 102. Various electronic components may be incorporated into a space formed between the front case 101 and the rear case 102. At least one middle case may be additionally positioned between the front case 101 and the rear case 102.

A display module 151 may be disposed on a front surface of the terminal body to output information. As illustrated, a window 151a of the display module 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed. Meanwhile, part of a side surface of the rear case 102 may be implemented to operate as a radiator.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The electronic device 100 may include a display module 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

The display module 151 is generally configured to output information processed in the electronic device 100. For example, the display module 151 may display execution screen information of an application program executing at the electronic device 100 or user interface (UI) and graphic user interface (GUI) information in response to the execution screen information.

The display module 151 may be implemented using two display devices, according to the configuration type thereof. For instance, a plurality of the displays 151 may be arranged on one side, either spaced apart from each other, or these devices may be integrated, or these devices may be arranged on different surfaces.

The display module 151 may include a touch sensor which senses a touch onto the display module 151 so as to receive a control command in a touching manner. Accordingly, when a touch is applied to the display module 151, the touch sensor may sense the touch, and a controller 180 may generate a control command corresponding to the touch. The content input by the touch method may be a text or numerical value, or a menu item capable of indication or designation in various modes.

In this manner, the display module 151 may form a flexible touch screen along with the touch sensor, and in this case, the touch screen may function as the user input unit 123 (refer to FIG. 1A). Therefore, the touch screen may replace at least part of the functions of the first manipulation unit 123a.

The first audio output module 152a may be implemented in the form of a receiver for transferring voice sounds to the user's ear or a loud speaker for outputting various alarm sounds or multimedia reproduction sounds.

The optical output module 154 may output light for indicating an event generation. Examples of the event generated in the electronic device 100 may include a message reception, a call signal reception, a missed call, an alarm, a schedule notice, an email reception, information reception through an application, and the like. When a user has checked a generated event, the controller 180 may control the optical output module 154 to stop the light output.

The first camera 121a may process video frames such as still or moving images acquired by the image sensor in a video call mode or a capture mode. The processed video frames may be displayed on the display module 151, and stored in the memory 170.

The first and second manipulation units 123a and 123b are examples of the user input unit 123, which may be manipulated by a user to provide input to the electronic device 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

On the other hand, the electronic device 100 may include a finger scan sensor which scans a user's fingerprint. The controller 180 may use fingerprint information sensed by the finger scan sensor as an authentication means. The finger scan sensor may be installed in the display module 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the electronic device 100 to interface with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the electronic device 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be installed in the terminal body or implemented on the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter wave (mmWave) band, as each of the plurality of antennas is implemented as an array antenna, a plurality of array antennas may be arranged in the electronic device.

The terminal body is provided with a power supply unit 190 (see FIG. 1A) for supplying power to the electronic device 100. The power supply unit 190 may include a batter 191 which is mounted in the terminal body or detachably coupled to an outside of the terminal body.

Hereinafter, description will be given of implementations of a multi-transmission system and an electronic device having the same, specifically, a power amplifier in a heterogeneous radio system and an electronic device having the same according to the present disclosure, with reference to the accompanying drawings. It should be understood by those skilled in the art that the present disclosure can be embodied in other specific forms without departing from the concept and essential characteristics thereof.

Figure 2:
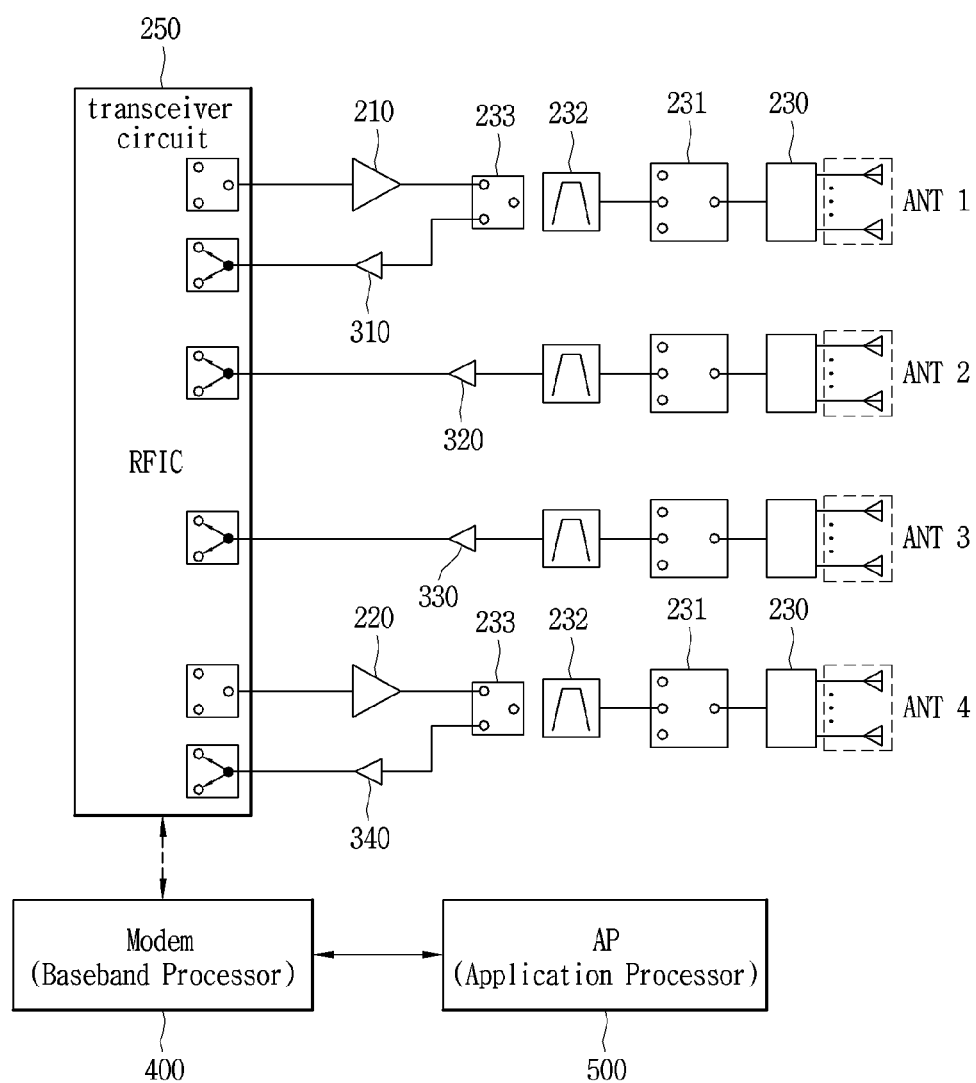
FIG. 2 is a block diagram illustrating a configuration of a wireless communication unit of an electronic device operable in a plurality of wireless communication systems according to an implementation.

FIG. 2 is a block diagram illustrating a configuration of a wireless communication unit of an electronic device operable in a plurality of wireless communication systems according to an implementation. Referring to FIG. 2, the electronic device includes a first power amplifier 210, a second power amplifier 220, and an RFIC 250. In addition, the electronic device may further include a modem 400 and an application processor (AP) 500. Here, the modem 400 and the application processor (AP) 500 may be physically implemented on a single chip, and may be implemented in a logical and functionally separated form. However, the present disclosure is not limited thereto and may be implemented in the form of a chip that is physically separated according to an application.

Meanwhile, the electronic device includes a plurality of low noise amplifiers (LNAs) 410 to 440 in the receiver. Here, the first power amplifier 210, the second power amplifier 220, the RFIC 250, and the plurality of low noise amplifiers 310 to 340 are all operable in a first communication system and a second communication system. In this case, the first communication system and the second communication system may be a 4G communication system and a 5G communication system, respectively.

As illustrated in FIG. 2, the RFIC 250 may be configured as a 4G/5G integrated type, but is not limited thereto, and may also be configured as a 4G/5G separation type according to an application. When the RFIC 250 is configured as a 4G/5G integrated type, it is advantageous in terms of synchronization between 4G/5G circuits, and also there is an advantage capable of simplifying control signaling by the modem 400.

On the other hand, when the RFIC 250 is configured as the 4G/5G separated type, the separated RFIDs may be referred to as 4G RFIC and 5G RFIC, respectively. In particular, when a band difference between the 5G band and the 4G band is large, such as when the 5G band is configured as a millimeter wave band, the RFIC 250 may be configured as a 4G/5G separation type. As such, when the RFIC 250 is configured as a 4G/5G separation type, there is an advantage that the RF characteristics can be optimized for each of the 4G band and the 5G band.

Meanwhile, even when the RFIC 250 is configured as a 4G/5G separation type, the 4G RFIC and the 5G RFIC may be logically and functionally separated but physically implemented on a single chip.

On the other hand, the application processor (AP) 500 is configured to control the operation of each component of the electronic device. Specifically, the application processor (AP) 500 may control the operation of each component of the electronic device through the modem 400.

For example, the modem 400 may be controlled through a power management IC (PMIC) for low power operation of the electronic device. Accordingly, the modem 400 may operate the power circuits of the transmitter and the receiver in a low power mode through the RFIC 250.

In this regard, when it is determined that the electronic device is in an idle mode, the application processor (AP) 500 may control the RFIC 250 through the modem 300 as follows. For example, when the electronic device is in an idle mode, the application processor 280 may control the RFIC 250 through the modem 300, such that at least one of the first and second power amplifiers 110 and 120 operates in the low power mode or is turned off.

According to another implementation, the application processor (AP) 500 may control the modem 300 to provide wireless communication capable of performing low power communication when the electronic device is in a low battery mode. For example, when the electronic device is connected to a plurality of entities among a 4G base station, a 5G base station, and an access point, the application processor (AP) 500 may control the modem 400 to enable wireless communication at the lowest power. Accordingly, the application processor (AP) 500 may control the modem 400 and the RFIC 250 to perform short-range communication using only the short-range communication module 113, even at the expense of throughput.

According to another implementation, when the remaining battery level of the electronic device is above the threshold, the modem 300 may be controlled to select an optimal wireless interface. For example, the application processor (AP) 500 may control the modem 400 to receive data through both the 4G base station and the 5G base station according to the remaining battery level and the available radio resource information. In this case, the application processor (AP) 500 may receive the remaining battery information from the PMIC, and the available radio resource information from the modem 400. Accordingly, when the remaining battery level and the available radio resources are sufficient, the application processor (AP) 500 may control the modem 400 and the RFIC 250 to receive data through both the 4G base station and 5G base station.

Meanwhile, a multi-transceiving system of FIG. 2 may integrate a transmitter and a receiver of each radio system into a single transceiver. Accordingly, there is an advantage in that a circuit portion for integrating two types of system signals may be eliminated at a RF front-end.

Furthermore, since the front end parts can be controlled by an integrated transceiver, the front end parts may be more efficiently integrated than when the transceiving system is separated by communication systems.

In addition, when separated by communication systems, it may be impossible to control other communication systems as required, or impossible to perform efficient resource allocation since system delay increases due to this. On the contrary, the multi-transceiving system as shown in FIG. 2 may control other communication systems as needed, thereby minimizing system delay due to this, and thus there is an advantage in that efficient resource allocation is possible.

Meanwhile, the first power amplifier 210 and the second power amplifier 220 may operate in at least one of the first and second communication systems. In this regard, when the 5G communication system operates in a 4G band or a sub-6 band, the first and second power amplifiers 1210 and 220 may operate in both the first and second communication systems.

On the contrary, when the 5G communication system operates in a millimeter wave (mmWave) band, the first and second power amplifiers 210, 220 may operate in either the 4G band and the other in the millimeter wave band.

On the other hand, a transmitter and a receiver may be integrated to implement two different wireless communication systems using a single antenna using a dual transmit/receive antenna. Here, 4×4 MIMO may be implemented using four antennas as shown in FIG. 2. In this case, 4×4 DL MIMO may be performed through downlink (DL).

Meanwhile, when the 5G band is a sub-6 band, first to fourth antennas (ANT1 to ANT4) may be configured to operate in both the 4G band and the 5G band. On the contrary, when the 5G band is a millimeter wave (mmWave) band, the first to fourth antennas (ANT1 to ANT4) may be configured to operate in either one of the 4G band and the 5G band. In this case, when the 5G band is a millimeter wave (mmWave) band, a plurality of separate antennas may be individually configured as an array antenna in the millimeter wave band.

Meanwhile, 2×2 MIMO may be implemented using two antennas connected to the first power amplifier 210 and the second power amplifier 220 among the four antennas. In this case, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 210, 220 may operate in the 5G band. Meanwhile, when the 5G communication system is implemented with 4Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is integrated into the RFIC corresponding to the RFIC 250, and an additional component does not need to be disposed externally, thereby improving component mountability. In more detail, a single pole double throw (SPDT) type switch may be provided in the RFIC corresponding to the controller 250 to select transmitters (TXs) of two different communication systems.

Also, the electronic device operable in the plurality of wireless communication systems according to the present disclosure may further include a phase controller 230, a duplexer 231, a filter 232, and a switch 233.

In a frequency band such as a mmWave band, the electronic device needs to use a directional beam to secure coverage for communication with a base station. To this end, each of the antennas ANT1 to ANT4 needs to be implemented as array antennas ANT1 to ANT4 including a plurality of antenna elements. The phase controller 230 is configurable to control the phase of a signal applied to each antenna element of each of the array antennas ANT1 to ANT4. In this regard, the phase controller 230 may control both the magnitude and phase of a signal applied to each antenna element of each of the array antennas ANT1 to ANT4. Accordingly, since the phase controller 230 controls both the magnitude and phase of the signal, it may also be referred to as a power and phase controller 230.

The duplexer 231 is configured to separate signals in a transmission band and a reception band from each other. In this case, signals in a transmission band transmitted through the first and second power amplifiers 210, 220 are applied to the antennas (ANT1, ANT4) through a first output port of the duplexer 231. On the contrary, a signal in a reception band received through the antennas (ANT1, ANT4) are received by the low noise amplifiers 310, 340 through a second output port of the duplexer 231.

The filter 232 may be configured to pass signals in a transmission band or a reception band and block signals in the remaining bands. In this case, the filter 232 may include a transmission filter connected to the first output port of the duplexer 231 and a reception filter connected to the second output port of the duplexer 231. Alternatively, the filter 232 may be configured to pass only signals in the transmission band or only signals in the reception band according to a control signal.

The switch 233 is configured to transmit only one of the transmission signal and the reception signal. In an embodiment of the present disclosure, the switch 233 may be configured in a single-pole double-throw (SPDT) type to separate a transmission signal and a reception signal in a time division duplex (TDD) scheme. Here, the transmission signal and the reception signal are signals of the same frequency band, and thus the duplexer 231 may be implemented in the form of a circulator.

Meanwhile, in another embodiment of the present disclosure, the switch 233 may also be applicable to a frequency division duplex (FDD) scheme. In this case, the switch 233 may be configured in the form of a double-pole double-throw (DPDT) to connect or block a transmission signal and a reception signal, respectively. On the other hand, the transmission signal and the reception signal may be separated by the duplexer 231, and thus the switch 233 is not necessarily required.

Meanwhile, the electronic device according to an implementation may further include a modem 400 corresponding to the controller. In this case, the RFIC 250 and the modem 400 may be referred to as a first controller (or a first processor) and a second controller (a second processor), respectively. On the other hand, the RFIC 250 and the modem 400 may be implemented as physically separated circuits. Alternatively, the RFIC 250 and the modem 400 may be logically or functionally divided into a single circuit.

The modem 400 may perform control and signal processing for the transmission and reception of signals through different communication systems through the RFIC 250. The modem 400 may be acquired through control information received from the 4G base station and/or the 5G base station. Here, the control information may be received through a physical downlink control channel (PDCCH), but the present disclosure is not limited thereto.

The modem 400 may control the RFIC 250 to transmit and/or receive signals through the first communication system and/or the second communication system at specific time and frequency resources. Accordingly, the RFIC 250 may control transmission circuits including the first and second power amplifiers 210, 220 to transmit 4G or 5G signals in a specific time interval. In addition, the RFIC 250 may control reception circuits including first through fourth low-noise amplifiers 310 to 340 to receive 4G or 5G signals in a specific time interval.

On the other hand, a detailed operation and function of the electronic device having a plurality of transparent antennas according to the present disclosure provided with a multi-transceiving system as shown in FIG. 2 will be discussed below.

In a 5G communication system according to the present disclosure, a 5G frequency band may be a higher frequency band than a sub-6 band. For example, the 5G frequency band may be a millimeter wave band, but the present disclosure is not limited thereto and may be changed according to an application.

Figure 3:
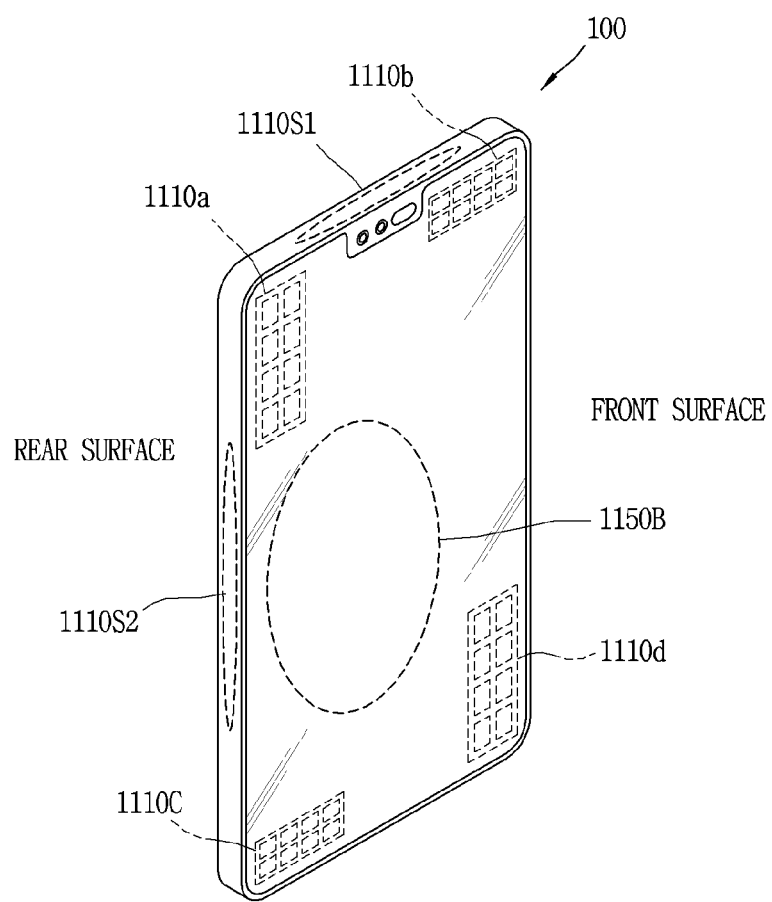
FIG. 3 is an example showing a configuration in which a plurality of antennas of an electronic device according to the present disclosure can be arranged.

FIG. 3 is an example showing a configuration in which a plurality of antennas of an electronic device according to the present disclosure can be arranged. Referring to FIG. 3, a plurality of antennas 1110a to 1110d may be disposed inside the electronic device 100. Here, the plurality of antennas 1110a to 1110d disposed inside the electronic device 100 may be implemented as antennas disposed on a multi-layer substrate.

Furthermore, each of the plurality of antennas 1110a to 1110d disposed inside the electronic device 100 may be implemented as an array antenna. In this regard, the plurality of array antennas 1110a to 1110d are configurable to transmit or receive signals in a millimeter wave band (mmWave band).

Specifically, the plurality of antennas 1110a to 1110d disposed inside the electronic device 100 may be implemented as a one-dimensional array antenna or a two-dimensional array antenna.

When the plurality of antennas 1110a to 1110d are arranged as a one-dimensional array antenna, it may be referred to as an M×1 array antenna, and beamforming can be made in one axial direction in which the plurality of antennas are disposed. In this regard, one axial direction in which the plurality of antennas are disposed may be a horizontal direction.

In another embodiment, when the plurality of antennas 1110a to 1110d are arranged as a one-dimensional array antenna, it may be referred to as an 1×N array antenna, and beamforming can be made in one axial direction in which the plurality of antennas are disposed. In this regard, one axial direction in which the plurality of antennas are disposed may be a vertical direction.

In a still another embodiment, when the plurality of antennas 1110a to 1110d are arranged as a two-dimensional array antenna, it may be referred to as an M×N array antenna. Meanwhile, beamforming can be made in a first axial direction in which a plurality of antennas are disposed and/or in a second axial direction orthogonal thereto. In this regard, the first axial direction in which the plurality of antennas are disposed may be a horizontal direction, and the second axial direction may be a vertical direction.

Referring to FIG. 3, the plurality of antennas 1110a to 1110d may be implemented as M×N array antennas to perform beam-forming in both a horizontal direction and/or a vertical direction.

Meanwhile, the plurality of antennas 1110a to 1110d according to the present disclosure may be disposed in a rotated state by a predetermined angle with respect to one another. Accordingly, there is an advantage in that the plurality of antennas 1110a to 1110d can be easily disposed with respect to one another and a level of mutual interference can be reduced. In FIG. 3, the plurality of antennas 1110a to 1110d are disposed in a substantially rotated state at an angle of 90 degrees to one another, but the present disclosure is not limited thereto and may be changed in various ways according to an application. For an example, the plurality of antennas 1110a to 1110d may be disposed in a substantially rotated state at an angle of 90 degrees to one another.

Specifically, the plurality of antennas 1110a to 1110d may be implemented as a 4×2 array antenna, but the number of antenna elements is not limited thereto, and may be changed in various ways according to an application.

Meanwhile, beam-forming may be independently performed through each of the array antennas 1110a to 1110d. Meanwhile, multi-input multi-output (MIMO) or diversity may be performed through a plurality of array antennas among the plurality of array antennas 1110a to 1110d.

Furthermore, a plurality of antennas 1110S1 and 1110S2 may be disposed on a side surface of the electronic device 100. Here, the number of the plurality of antennas 1110S1 and 1110S2 disposed on the side surface is not limited to two, but can be extended to four, six, eight or the like according to an application.

On the other hand, part of the plurality of antennas 1110S1 and 1110S2 disposed on the side surface may be implemented as array antennas in which a plurality of patch antennas are disposed to operate in a millimeter wave band. Alternatively, part of the plurality of antennas 1110S1 and 1110S2 disposed on the side surface may be implemented as a conductive member to operate in a 4G band or a 5G Sub6 band.

In addition, the antennas 1150B may be disposed on a rear surface of or inside the electronic device 100 toward the rear surface. Here, the number of antennas 1150b can be extended to two, four, six, eight or the like according to an application, like the number of the aforementioned plurality of antennas 1110a to 1110d.

For an example, for the antennas 1150B disposed inside of the electronic device 100 toward the rear surface may have a multi-layer substrate structure, antenna elements may be disposed at a rear side of the multi-layer substrate. Accordingly, by the antenna elements disposed at the rear side of the multi-layer substrate, the antennas 1150B may radiate signals toward the rear surface of the electronic device 100. In this regard, a dielectric material may be disposed on a rear region of the electronic device 100 from which signals are radiated by the antennas 1150B. Accordingly, while defining an exterior of the electronic device 100 as a metal case, it may be configured such that the dielectric material is disposed in some regions thereof.

In this regard, the antennas 1150B disposed inside of the electronic device 100 toward the rear surface may be configured with a plurality of array antennas. Accordingly, signals may be radiated toward the rear surface the electronic device 100 by the antennas 1150B disposed inside the electronic device 100 toward the rear surface.

Specifically, each of the plurality of array antennas 1150B may be configured with a mmWave antenna module. Here, the mmWave antenna module may be disposed on the rear surface, that is, back surface, of the electronic device 100, and may be disposed in a region other than a region where the battery/camera module/speaker module is disposed on the back surface.

On the other hand, referring to FIG. 2, a plurality of antennas ANT1 to ANT4 may be disposed on a front surface of the electronic device 100. Here, each of the plurality of antennas ANT1 to ANT4 may be configured as an array antenna to perform beamforming in a millimeter wave band. Each of the plurality of antennas ANT1 to ANT4 configured with a single antenna and/or a phased array antenna for use of a wireless circuit such as the transceiver circuit 250 is mounted on the electronic device 100.

Meanwhile, referring to FIGS. 2 and 3, at least one signal may be transmitted or received through the plurality of antennas 1110a to 1110d corresponding to the plurality of antennas ANT1 to ANT4. In this regard, each of the plurality of antennas 1110a to 1110d may be configured as an array antenna. The electronic device may communicate with a base station through any one of the plurality of antennas 1110a to 1110d. Alternatively, the electronic device may perform multi-input multi-output (MIMO) communication with the base station through two or more antennas among the plurality of antennas 1110a to 1110d.

Meanwhile, the present disclosure may transmit or receive at least one signal through the plurality of antennas 1110S1 and 1110S2 on a side surface of the electronic device 100. Unlike the drawings, at least one signal may be transmitted or received through the plurality of antennas 1110S1 to 1110S4 on a front surface of the electronic device 100. In this regard, each of the plurality of antennas 1110S1 to 1110S4 may be configured as an array antenna. The electronic device may communicate with a base station through any one of the plurality of antennas 1110S1 to 1110S4. Alternatively, the electronic device may perform multi-input multi-output (MIMO) communication with the base station through two or more antennas among the plurality of antennas 1110S1 to 1110S4.

On the other hand, in the present disclosure, at least one signal may be transmitted or received through the plurality of cone antennas 1110a to 1110d, 1150B, and 1110S1 to 1110S4 on a front surface and/or a side surface of the electronic device 100. In this regard, each of the plurality of antennas 1110a to 1110d, 1150B, and 1110S1 to 1110S4 may be configured as an array antenna. The electronic device may communicate with the base station through any one of the plurality of antennas 1110a to 1110d, 1150B, and 1110S1 to 1110S4. Alternatively, the electronic device may perform multi-input multi-output (MIMO) communication with the base station through two or more antennas among the plurality of antennas 1110a to 1110d, 1150B, and 1110S1 to 1110S4.

Figure 4:
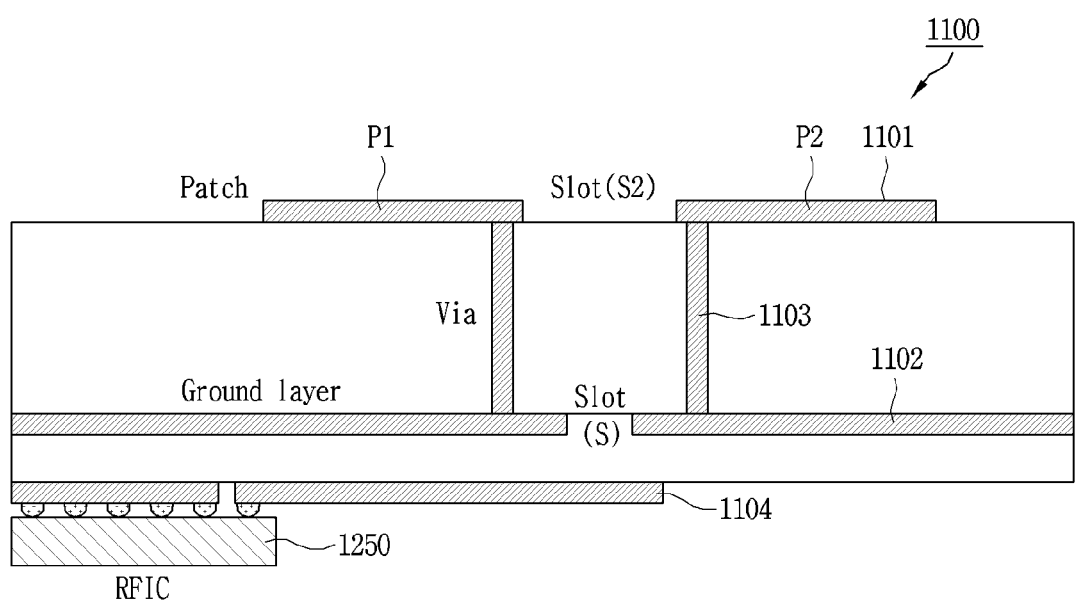
FIG. 4 shows a side view of a broadband antenna implemented on a multi-layer substrate according to the present disclosure.

Hereinafter, an electronic device having an array antenna that is operable in a millimeter wave band according to the present disclosure will be described. In this regard, FIG. 4 shows a side view of a broadband antenna implemented on a multi-layer substrate according to the present disclosure.

Figure 5A:
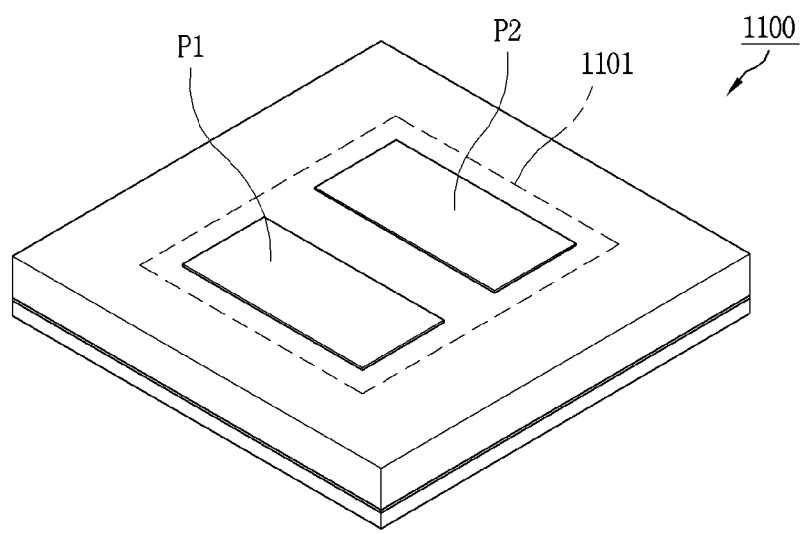
FIG. 5A shows a perspective view of the broadband antenna implemented on a multi-layer substrate according to the present disclosure.
Figure 5B:
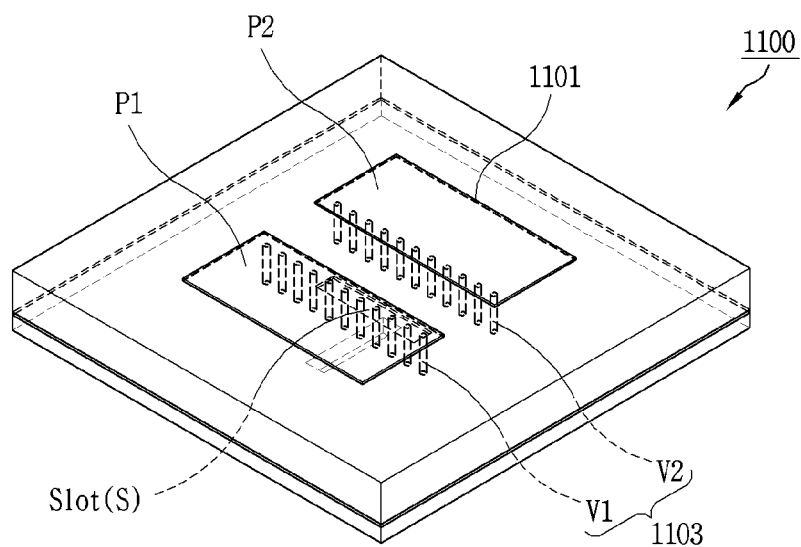
FIG. 5B shows a structure in which a patch antenna is connected to a ground adjacent to a slot by a via in the broadband antenna implemented on a multi-layer substrate according to the present disclosure.
Figure 5C:
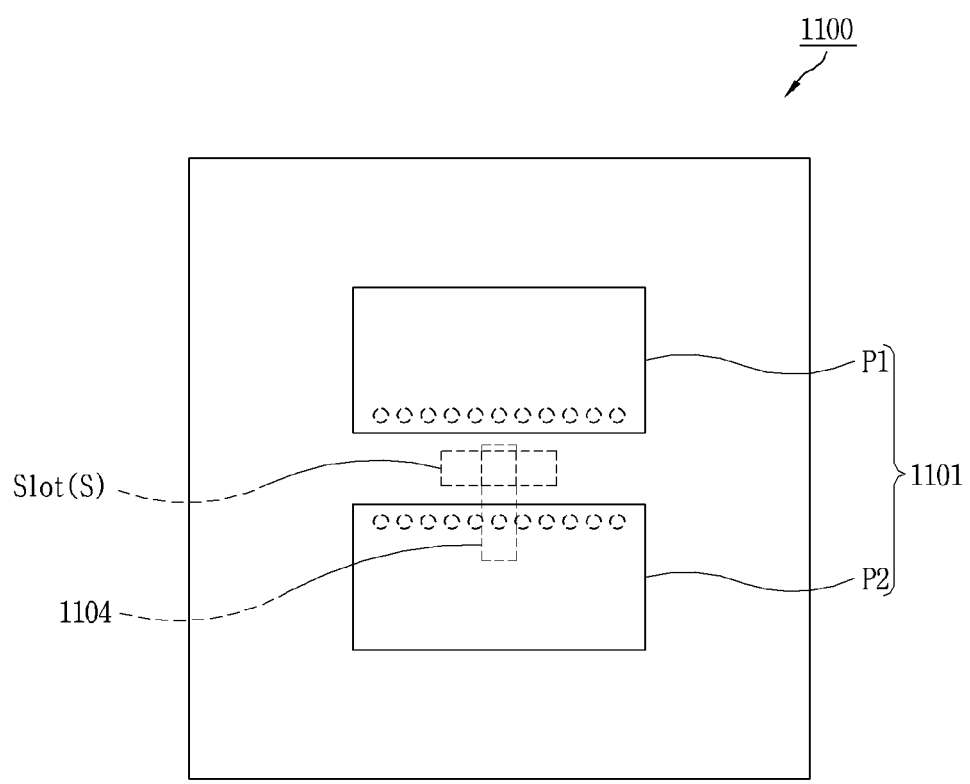
FIG. 5C shows a front view of the broadband antenna implemented on a multi-layer substrate according to the present disclosure.

On the other hand, FIG. 5A shows a perspective view of the broadband antenna implemented on a multi-layer substrate according to the present disclosure. FIG. 5B shows a structure in which a patch antenna is connected to a ground adjacent to a slot by a via in the broadband antenna implemented on a multi-layer substrate according to the present disclosure. FIG. 5C shows a front view of the broadband antenna implemented on a multi-layer substrate according to the present disclosure. In this regard, the structure of the broadband antenna implemented on the multi-layer substrate of FIGS. 5B and 5C is expressed in a perspective view in order to accurately describe the multi-layer structure.

Figure 6A:
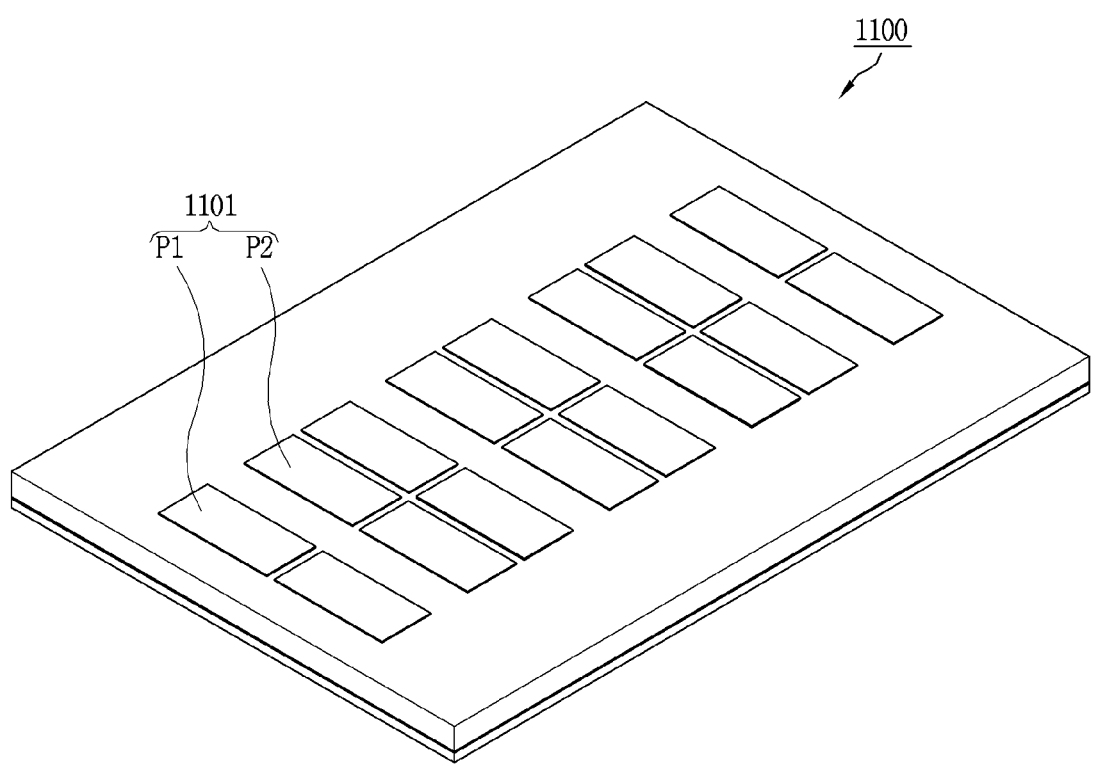
FIGS. 6A to 6C show an array antenna structure operable in a millimeter wave band according to the present disclosure.
Figure 6B:
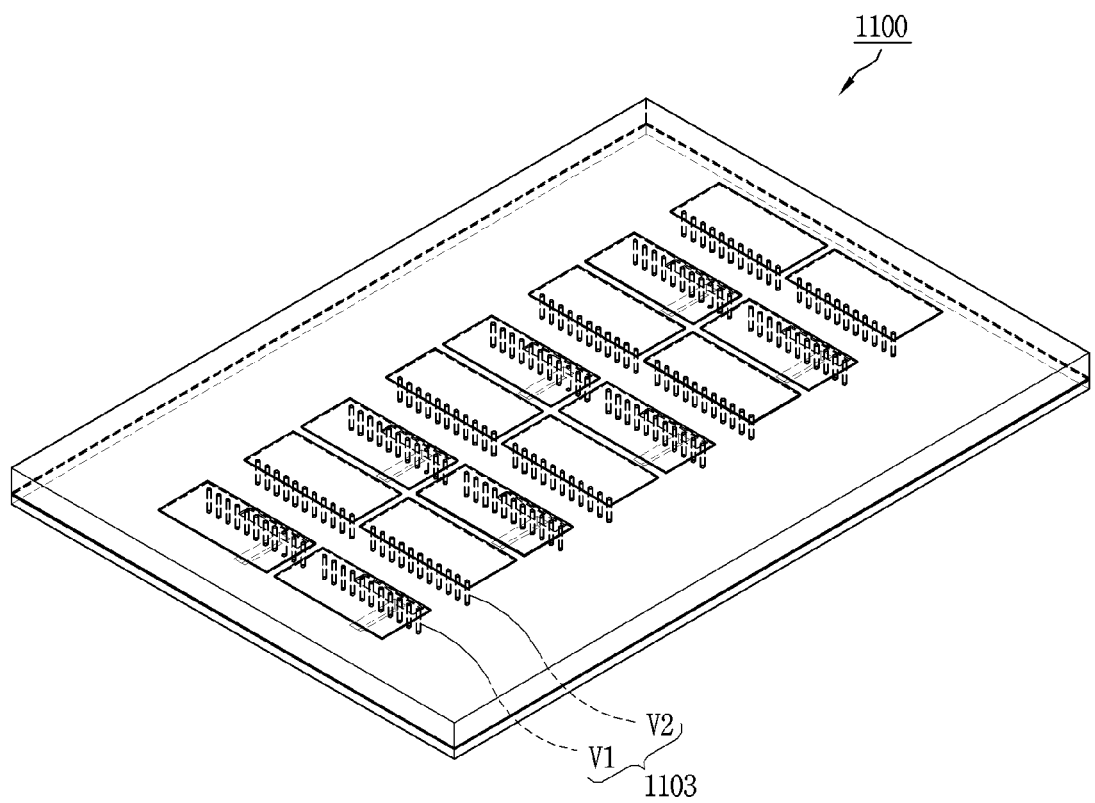
Figure 6C:
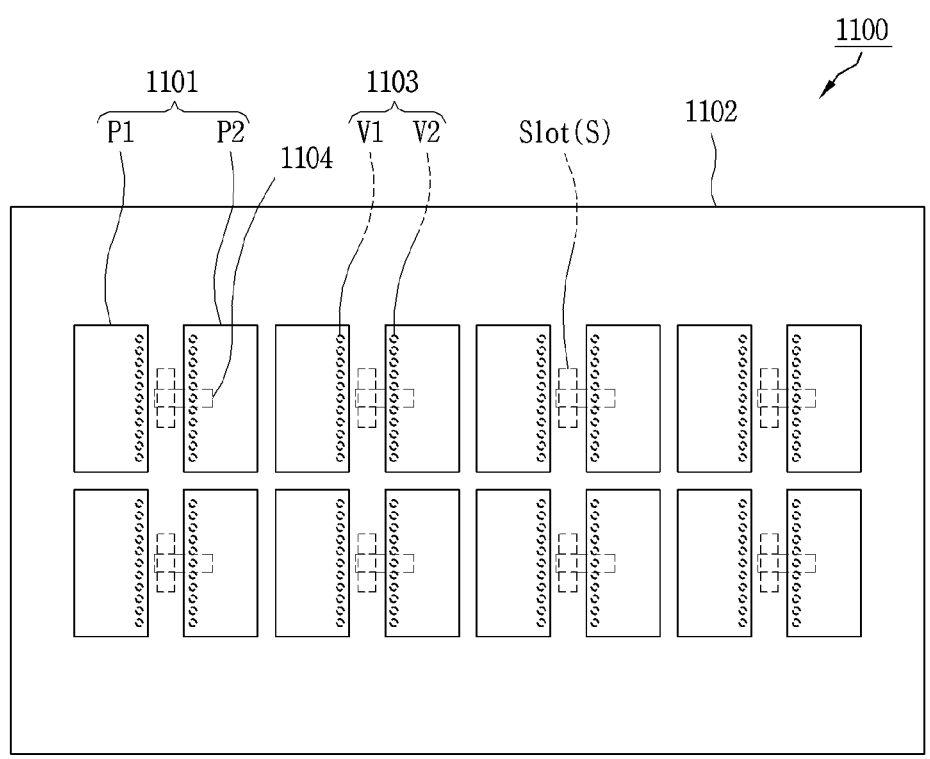

On the other hand, FIGS. 6A to 6C show an array antenna structure operable in a millimeter wave band according to the present disclosure. Specifically, FIG. 6A shows a perspective view of an array antenna implemented on a multi-layer substrate according to the present disclosure. Furthermore, FIG. 6B shows a structure in which a patch antenna is connected to a ground adjacent to a slot by a via in an array antenna implemented on a multi-layer substrate according to the present disclosure. FIG. 6C shows a front view of the array antenna implemented on a multi-layer substrate according to the present disclosure.

In this regard, the structure of the array antenna implemented on the multi-layer substrate of FIGS. 6B and 6C is expressed in a perspective view in order to accurately describe the multi-layer structure. Meanwhile, referring to FIG. 6C, an operation of an electronic device having an antenna that is operable in a millimeter wave band according to the present disclosure will be described in detail. Specifically, the electronic device is configured to include a transceiver circuit 1250 and a baseband processor 1400 in addition to an array antenna 1100.

Referring to FIGS. 4 to 6C, an electronic device having an antenna operable in a millimeter wave band according to the present disclosure is configurable to include the array antenna 1100 and the transceiver circuit 1250.

The array antenna 1100 is implemented as a multi-layer substrate inside the electronic device, and is configured to include a plurality of antenna elements. Specifically, each antenna element of the array antenna 1100 is configured to include a patch antenna 1101 and a ground layer 1102. In addition, each antenna element of the array antenna 1100 may be configured to further include a feeding line 1104.

In this regard, an antenna structure capable of operating in a millimeter wave band and a broadband securing mechanism according to the present disclosure will be described as follows.

1) The mmWave antenna module includes a package (dielectric), a mmWave RFIC chip, a feeding line, a slot, a ground, a via, and a patch.

2) The package may be implemented as a printed circuit board (PCB).
3) The RFIC chip and the feeding line of the antenna are connected to each other through a bumping connection structure of the chip.
4) The feeding line is fed by coupling to the patch antenna through the slot at an upper layer thereof.
5) The patch antenna is connected to the via.
6) In this case, the via operates as a magnetic dipole antenna, and the patch on a top surface thereof operates as an electric dipole antenna to secure the broadband performance of the antenna.

Meanwhile, the patch antenna 1101 is disposed on a specific layer of the multi-layer substrate, and is configurable to include a first patch P1 and a second patch P2 spaced apart from each other by a predetermined spacing. Here, the patch antenna 1101 may be disposed on a front side of the multi-layer substrate to radiate a signal toward a front surface of the electronic device. Alternatively, the patch antenna 1101 may be disposed at a rear side of the multi-layer substrate to radiate a signal toward the rear surface of the electronic device.

Meanwhile, the ground layer 1102 is disposed under the patch antenna, and may include a slot S. Here, a slot S may be configured to have a predetermined length and a predetermined width in length and width directions. The shape of the slot (S) can be changed in various ways according to an application in addition to a rectangular shape. Depending on an application, as will be described later, the shape of the slot S may be configured as an orthogonal slot in which two orthogonal slots are combined with each other.

According to the present disclosure, the first patch P1 and the second patch P2 constituting the patch antenna 1101 may be connected to the ground layer 1102 and a plurality of vias 1103. Accordingly, the plurality of vias 1103 may be disposed in the length direction of the slot S to be adjacent to the slot S.

Meanwhile, a feeding line 1104 is disposed under the ground layer 1102 and is configured to transmit a signal to the patch antenna 1101 through the slot S. Here, the feeding line 1104 may be implemented in the form of a microstrip line or in the form of a strip line in which a ground layer is also disposed thereunder.

In this regard, the plurality of vias 1103 may be spaced apart from a boundary between the first patch P1 and the second patch P2 by a predetermined distance to be disposed at a predetermined spacing. A predetermined interval between which the plurality of vias 1103 are disposed may be determined according to a wavelength corresponding to an operating frequency. Accordingly, arrangement intervals between the plurality of vias 1103 may be defined to be the same.

For another example, the plurality of vias 1103 may be more precisely disposed in a region where the feeding line 1104 is disposed. Accordingly, the plurality of vias 1103 may be disposed as a larger number of vias in a center portion of the patch antenna 1101. Accordingly, the plurality of vias 1103 may be disposed with a smaller number of vias in a boundary portion of the patch antenna 1101.

On the other hand, an array antenna in which the antenna elements configured with the patch antenna 1101, the ground layer 1102, the plurality of vias 1103, and the feeding line 1104 according to the present disclosure are arranged is operable in a millimeter wave band, particularly in a 60 GHz band. In this regard, the array antenna according to the present disclosure may operate in any millimeter wave band, for example, a 28 GHz band, a 39 GHz band, and a 64 GHz band. For example, the antenna operating in the 64 GHz band may be a broadband antenna operating in 57 GHz to 70 GHz or 53 GHz to 75 GHz.

Figure 7:
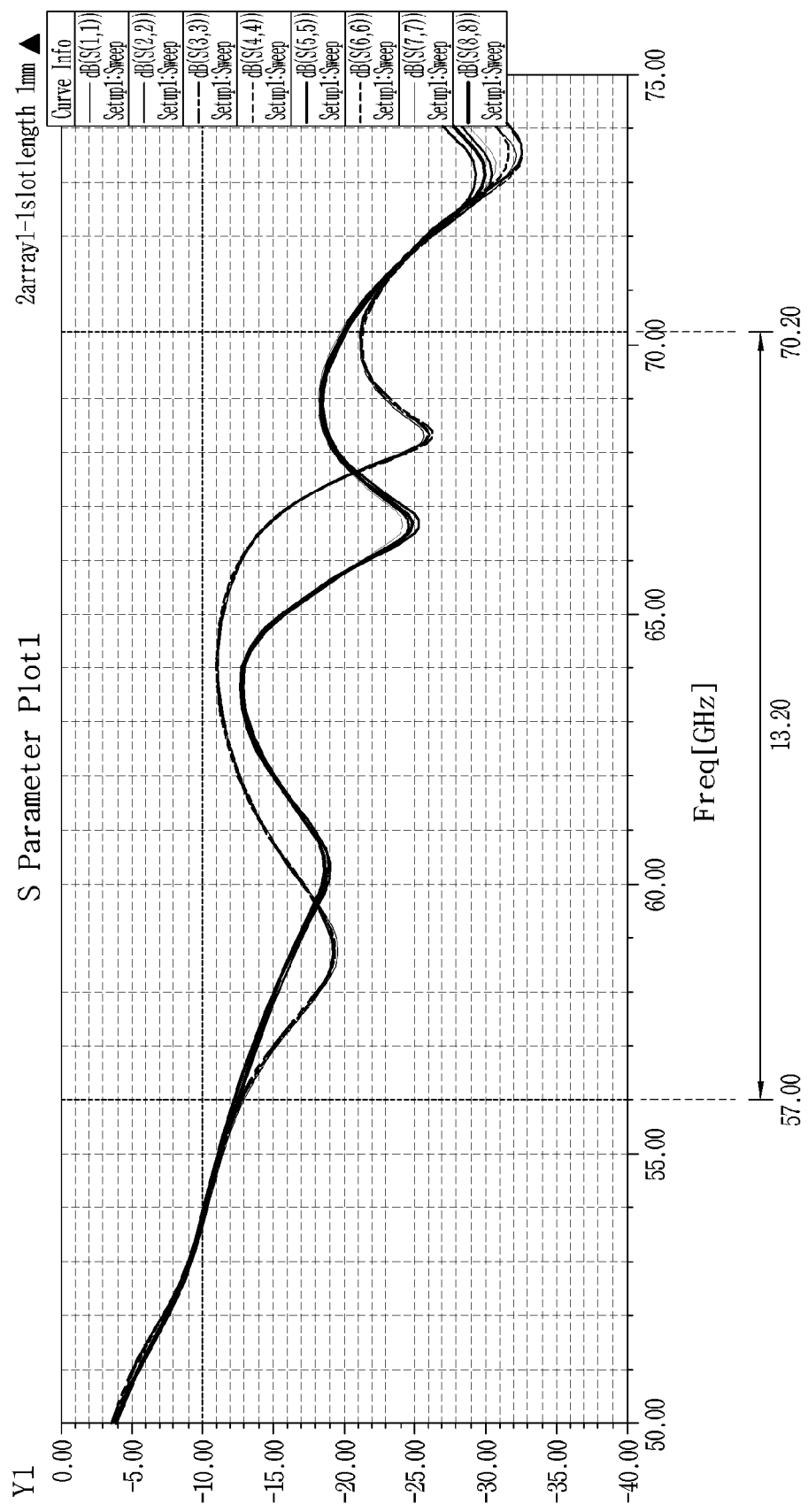
FIG. 7 shows return loss characteristics measured in each antenna element of an array antenna according to the present disclosure.

In addition, the array antenna 1100 according to the present disclosure in which the above-described antenna elements are arranged has the following characteristics. In this regard, FIG. 7 shows return loss characteristics measured in each antenna element of an array antenna according to the present disclosure. Referring to FIG. 7, it can be seen that the return loss measured in each antenna element is −10 dB or less in 53 GHz to 75 GHz. Accordingly, each antenna element of the array antenna according to the present disclosure is a broadband antenna operating at 53 GHz to 75 GHz.

An array antenna in which the antenna elements configured with the patch antenna 1101, the ground layer 1102, the plurality of vias 1103, and a feeding line 1104 according to the present disclosure are arranged has the following structural and technical characteristics. However, the structural characteristics and technical characteristics are not limited thereto, and may be changed through design change and optimization according to application.

1) An overall size of the array antenna is about 7.5 mm×14 mm.
2) The patch antenna at the top is disposed at a distance of about 2.5 to 3.5 mm corresponding to 0.5*wavelength to 0.7*wavelength.
3) Vias are connected to the patch antenna and the ground.
4) In the present disclosure, a 2×4 array antenna is illustrated, but the number of antenna elements can be changed according to an application.
5) A return loss (S11) of the array antenna is −10 dB or less in a band from 53 GHz to 75 GHz or more, and each element of the array antenna has broadband characteristics.
6) An isolation (S21) of the array antenna has an isolation of −10 dB or less in an entire operating band.

Figure 8:
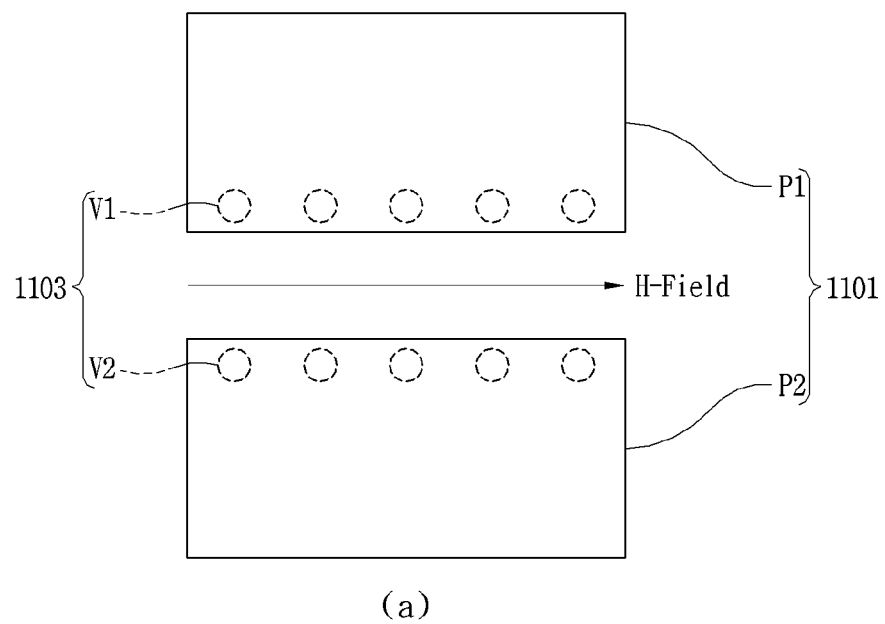
FIG. 8 shows an operation principle in different bands in a structure in which a plurality of vias are disposed at predetermined intervals on an inner boundary of a patch antenna according to the present disclosure.
Figure 8:
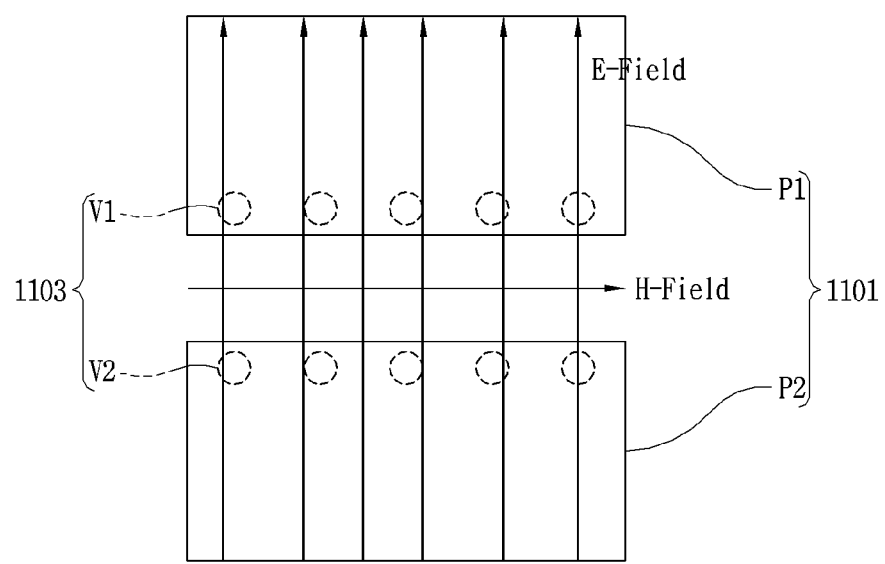

On the other hand, FIG. 8 shows an operation principle in different bands in a structure in which a plurality of vias are disposed at predetermined intervals on an inner boundary of a patch antenna according to the present disclosure.

Referring to FIG. 8A, at operating frequency 1 (a first frequency band), the patch antenna 1101 operates like a slot antenna, and a field distribution thereof is similar to that of a magnetic dipole. That is, for each antenna element of the array antenna 1100, a magnetic field is formed in a second slot S2 between the first patch P1 and the second patch P2 in the first frequency band. Here, the magnetic field may be expressed as an H-field. Due to this magnetic field, the antenna element operates as a magnetic dipole type slot antenna.

Referring to FIG. 8B, the field distribution of the patch antenna 1101 at operating frequency 2 (a second frequency band) is similar to that of an electric dipole. That is, each antenna element of the array antenna 1100, the antenna element operates as an electric dipole type patch antenna by the first patch P1 and the second patch P2 in a second frequency band different from the frequency band. Here, an electric field formed in the patch antenna 1101 may be expressed as an E-field. By this electric field, the antenna element operates as an electric dipole-type patch antenna.

Accordingly, through a structure in which a plurality of vias are disposed at predetermined intervals at an inner boundary of the patch antenna according to the present disclosure, each antenna element operates as a broadband antenna capable of operating in both the first and second frequency bands.

Meanwhile, the plurality of vias 1103 according to the present disclosure are configured to include a plurality of first vias V1 and a plurality of second vias V2. In this regard, the plurality of first vias V1 are disposed at predetermined intervals on one side surface of the first patch P1 to connect the one side surface of the first patch P1 and the ground layer 1102. Meanwhile, the plurality of second vias V2 may be disposed at predetermined intervals on the other side surface of the second patch P2 facing the one side surface of the first patch P1 to the other side surface of the second patch P2 to connect the ground layer 1102.

That is, a predetermined number of the plurality of vias 1103 according to the present disclosure may be disposed adjacent to the inner slot region S2 of the patch antenna 1102 or the slot S of the ground layer 1102. Due to the plurality of vias 1103 disposed in this way, the patch antenna 1101 operates as a magnetic dipole in a specific band and operates as a slot coupling type electric dipole in another band. Accordingly, the structure in which a plurality of vias are disposed at predetermined intervals at an inner boundary of the patch antenna according to the present disclosure may perform a broadband operation.

Meanwhile, in connection with such a broadband operation, a first signal of the first frequency band forms a magnetic field through the second slot S2 between the first patch P1 and the second patch P2 through the feeding line 1104 and the plurality of vias 1103, V1, V2. In addition, a second signal of the second frequency band is coupled to the patch antenna 1101 through the feeding line 1104 and the slot S to form an electric field on the patch antenna 1101.

Meanwhile, the transceiver circuit 1250 is configured to control a signal applied to each antenna element of the array antenna 1100 to perform beamforming through the array antenna 1100. To this end, the transceiver circuit 1250 may vary the phase of a signal applied to each antenna element of the array antenna 1100 and apply the corresponding signal to each antenna element. Furthermore, the transceiver circuit 1250 may vary the phase and magnitude of a signal applied to each antenna element of the array antenna 1100 to apply the corresponding signal to each antenna element.

On the other hand, the RFIC (Radio Frequency Integrated Chip), which is the transceiver circuit 1250, is connected to the feeding line 1104 in the form of bumping under the feeding line 1104 to transmit a millimeter wave band signal between the RFIC 1250 and the feeding line 1104. Accordingly, there is an advantage in that signal transmission reliability is enhanced through the plurality of bumping fastening portions while a signal from the RFIC 1250 is transmitted to the feeding line 1104 in a low loss manner.

On the other hand, for an antenna structure having a plurality of vias disposed adjacent to slots implemented in a multi-substrate according to the present disclosure, a parasitic patch may be disposed above the patch antenna to operate in a broader band. In this regard, FIG. 9 illustrates a broadband antenna structure and an electronic device body structure disposed on a multi-layer substrate further including a parasitic patch according to an embodiment of the present disclosure.

In this regard, the technical characteristics and structural characteristics of the broadband antenna structure and the electronic device body structure disposed on the multi-layer substrate further including the parasitic patch according to the present disclosure are as follows:

1) As an external enclosure of the electronic device is formed of a metal material, at least one parasitic patch may be stacked in an offset structure to radiate a signal to the dielectric region or to tilt the radiation direction in a specific direction.
2) A multi-layer substrate is disposed above the patch antenna, and one to two or more parasitic patches are disposed thereon.
3) Since the plurality of parasitic patches act as a director, they can be stacked in a desired direction to be directed.
4) In this case, a length of the parasitic patch may have a length of 0.5*wavelength of an operating center frequency.
5) A separation distance between each patch has a separation distance of 0.3 to 0.4*wavelength.

Figure 9:
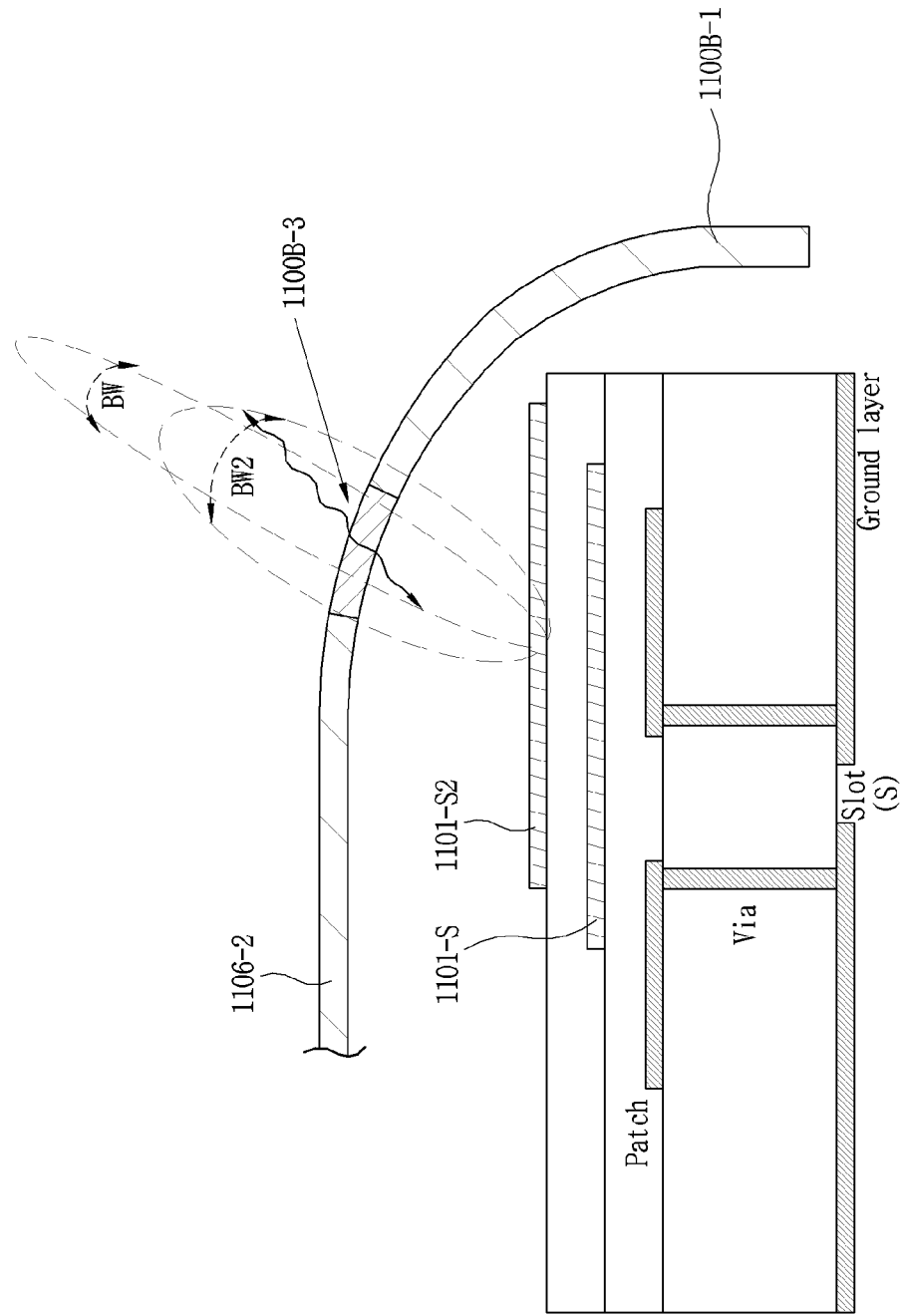
FIG. 9 illustrates a broadband antenna structure and an electronic device body structure disposed on a multi-layer substrate further including a parasitic patch according to an embodiment of the present disclosure.

Referring to FIG. 9, the electronic device according to the present disclosure may further include a parasitic patch 1101-S on the multi-layer substrate. Here, the parasitic patch 1101-S is disposed above the patch antenna 1101, and thus may be referred to as a stack patch or a director.

The parasitic patch 1101-S may be disposed at an upper portion of a substrate above the patch antenna 1101 to extend the operating bandwidth of the antenna element. In this case, as the center of the parasitic patch 1101-S is offset compared to the center of the patch antenna 1101, a beam peak of the antenna element may be tilted by a first angle from the boresight.

In addition, the antenna according to the present disclosure may further include a second parasitic patch 1101-S2 above the parasitic patch 1101-S. That is, the second parasitic patch 1101-S2 may be disposed above the parasitic patch 1101-S to further extend the operating bandwidth of the antenna element. Specifically, as the center of the second parasitic patch 1101-S2 is offset compared to the center of the parasitic patch 1101-S, a beam peak of the antenna element may be tilted by a second angle greater than the first angle from the boresight.

Meanwhile, as a directing direction of the beam is changed by the at least one parasitic patch according to the present disclosure, an external enclosure structure of the electronic device may be defined to allow a signal in the directing direction to pass therethrough. In this regard, the multi-layer substrate may be disposed inside a body 1100B of the electronic device. Meanwhile, as the directing direction of the beam is changed by the at least one parasitic patch, the body 1100B of the electronic device includes a dielectric region to allow a signal in the directing direction to pass therethrough.

In this regard, the body 1100B of the electronic device may be configured to include a metal region 1100B1, an un-transparent region 1100B2, and a dielectric region 1100B3.

The metal region 1100B1 may be defined at a side surface portion of the electronic device, and may be formed of a metal material to disallow a signal radiated from the antenna element to pass therethrough. On the other hand, the un-transparent region 1100B2 is defined at a front or rear surface portion of the electronic device, and may be formed of a specific material to disallow a signal radiated from the antenna element to pass therethrough. In this regard, the un-transparent region 1102 may be configured with a metal case made of a metal material. Meanwhile, the dielectric region 1100B3 may be disposed between the metal region 1100B1 and the un-transparent region 1100B2 at a side surface portion thereof may be formed of a dielectric material to allow a signal radiated from the antenna element to pass therethrough.

Referring to FIGS. 3 to 9, broadband antenna elements having a multi-layer substrate structure according to the present disclosure may be configured as an array antenna 1100. In this regard, the array antenna 1100 may be configured as a one-dimensional array antenna such that a predetermined number of antenna elements are disposed in one axial direction to perform beamforming in the one axial direction. In this case, a beam-formed signal may be radiated from the array antenna 1100 to the outside through a curved dielectric region 1100B3 defined in the body 1100B2 of the electronic device.

In another embodiment, the array antenna 1100 may include a two-dimensional array antenna in which a predetermined number of antenna elements are disposed in one axial direction and a predetermined number of antenna elements are disposed in the other axial direction. In this case, a beam-formed signal may be radiated from the array antenna 1100 to the outside through a curved second dielectric region 1100B3-2 defined in the body of the electronic device.

Specifically, a width of the second dielectric region 1100B3-2 may be disposed to be narrower than that of the dielectric region 1100B3 due to the directivity of the two-dimensional array antenna in the other axial direction. In this regard, a beam width BW2 of the two-dimensional array antenna is defined to be narrower than a beam width BW1 of the one-dimensional array antenna. Accordingly, the width of the dielectric region 1100B3-2 may be defined to be narrower than that of the dielectric region 1100B3.

Meanwhile, a broadband antenna structure in which a plurality of vias are disposed adjacent to an inner slot according to the present disclosure can be extended to a dual feeding structure. According to such a dual feeding structure, multi-input multi-output (MIMO) using orthogonal horizontal/vertical polarization can be implemented.

Figure 10A:
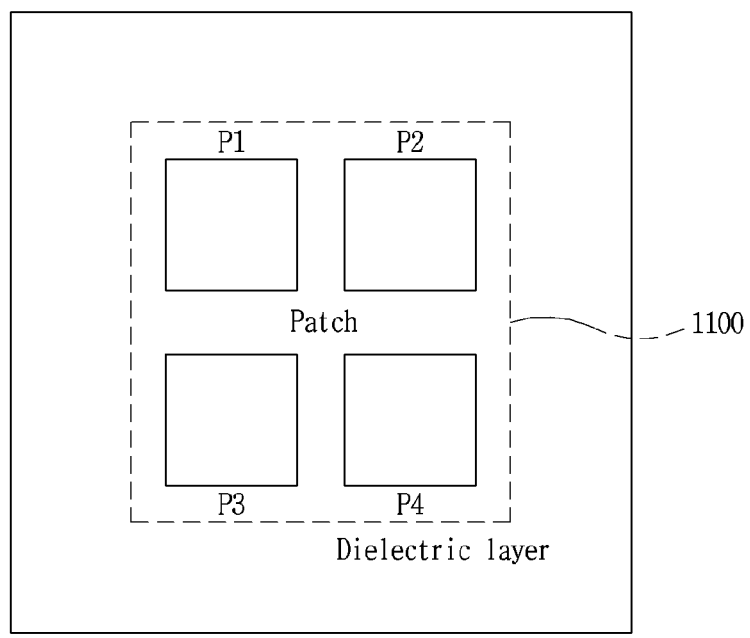
FIGS. 10A to 10C show front views for each layer of a single antenna element having a dual feeding structure according to the present disclosure.
Figure 10B:
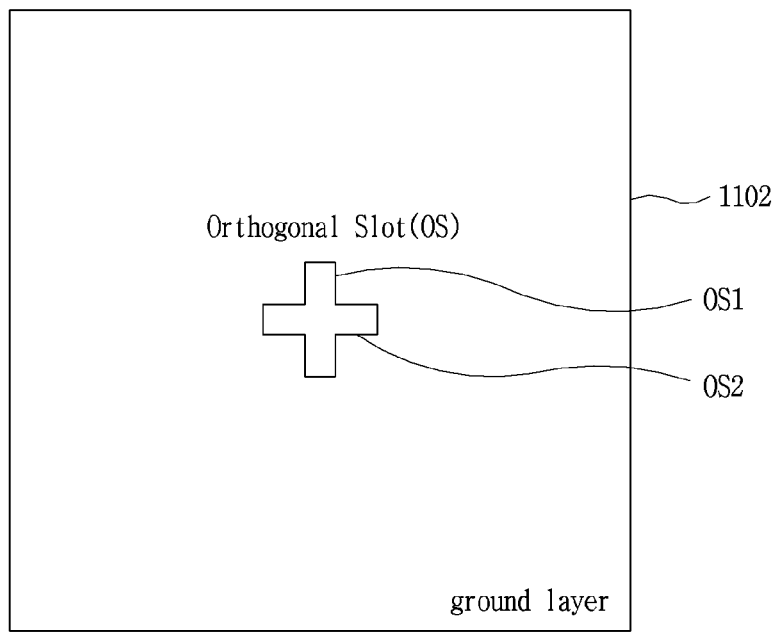
Figure 10C:
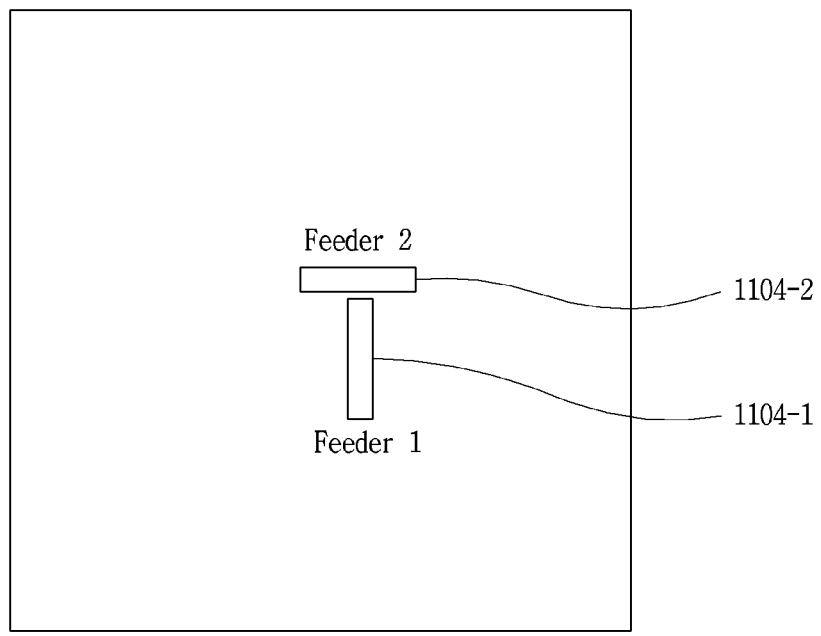

In this regard, on the other hand, FIGS. 10A to 10C show front views for each layer of a single antenna element having a dual feeding structure according to the present disclosure.

The technical characteristics of the broadband antenna having a dual feeding (polarization) structure in which a plurality of vias are disposed adjacent to an inner slot according to the present disclosure are as follows.

1) When implementing dual polarization according to the present disclosure, the antenna structure has a patch antenna structure divided with respect to vertical and horizontal directions.
2) When implementing dual polarization, a patch surface at the top (1st layer) is divided into four and a plurality of vias are defined, and vias are defined and surrounded by two of the four surfaces of each patch.
3) A slot for coupling feeding has a cross slot shape.
4) A feeding line feeds in 90 degree directions in the cross slot, and generates polarized wave 1 and polarized wave 2 that are orthogonal to each other.

FIG. 10A illustrates a patch antenna segmented in horizontal and vertical directions so as to be coupled by the orthogonal slot. Referring to FIG. 10A, the patch antenna 1101 forming horizontal/vertical polarization may include first to fourth patches P1 to P4. That is, the patch antenna 1101 may include the first to fourth patches P1 to P4 spaced apart from each other in one axial direction and the other axial direction.

FIG. 10B illustrates an orthogonal slot (OS) disposed on the ground layer 1102. Referring to FIG. 10B, the ground layer 1102 includes an orthogonal slot OS disposed perpendicular to one axial direction and the other axial direction.

FIG. 10C illustrates a structure in which a plurality of feeding lines are disposed on a substrate disposed under a ground layer. Referring to FIG. 10C, the plurality of feeding lines includes a first feeding line 1104-1 and a second feeding line 1104-2. A first feeding line 1104-1 is disposed in parallel to a vertical slot OS1 of the orthogonal slot OS under the ground. That is, the first feeding line 1104-1 is disposed perpendicular to a horizontal slot OS2 of the orthogonal slot OS under the ground. Accordingly, each antenna element may generate a vertically polarized signal by the first signal from the first feeding line 1104-1.

Meanwhile, a second feeding line 1104-2 is disposed in parallel to a horizontal slot OS2 of the orthogonal slot OS under the ground. That is, the second feeding line 1104-2 is disposed perpendicular to the vertical slot OS1 of the orthogonal slot OS under the ground. Accordingly, each antenna element may generate a horizontally polarized signal by the second signal from the second feeding line 1104-2.

On the other hand, FIGS. 11A to 11D show a perspective view and front views for each layer of a broadband antenna structure in which a plurality of vias having a dual feeding structure according to the present disclosure are disposed adjacent to an inner slot.

Figure 11A:
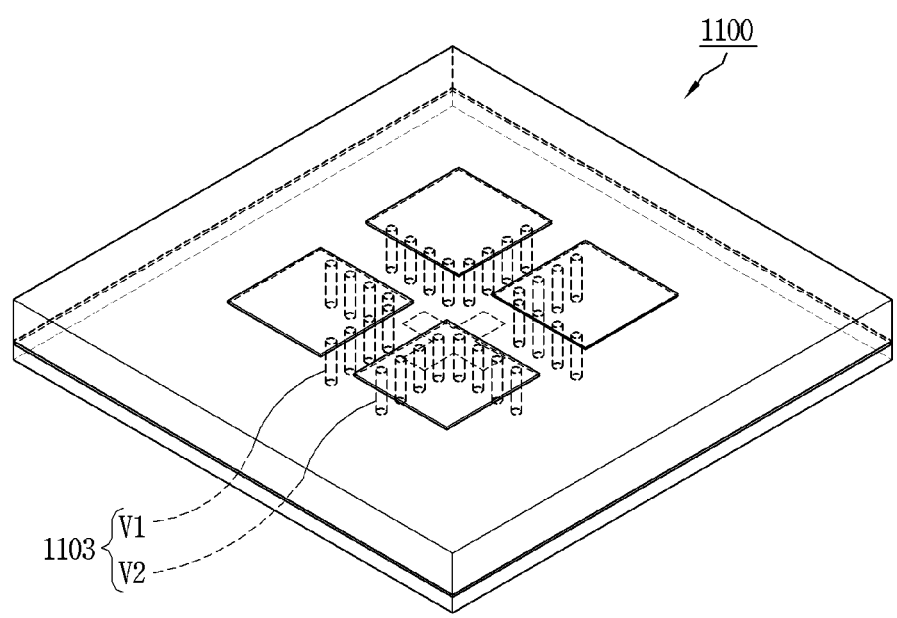
FIGS. 11A to 11D show a perspective view and front views for each layer of a broadband antenna structure in which a plurality of vias having a dual feeding structure according to the present disclosure are disposed adjacent to an inner slot.
Figure 11B:
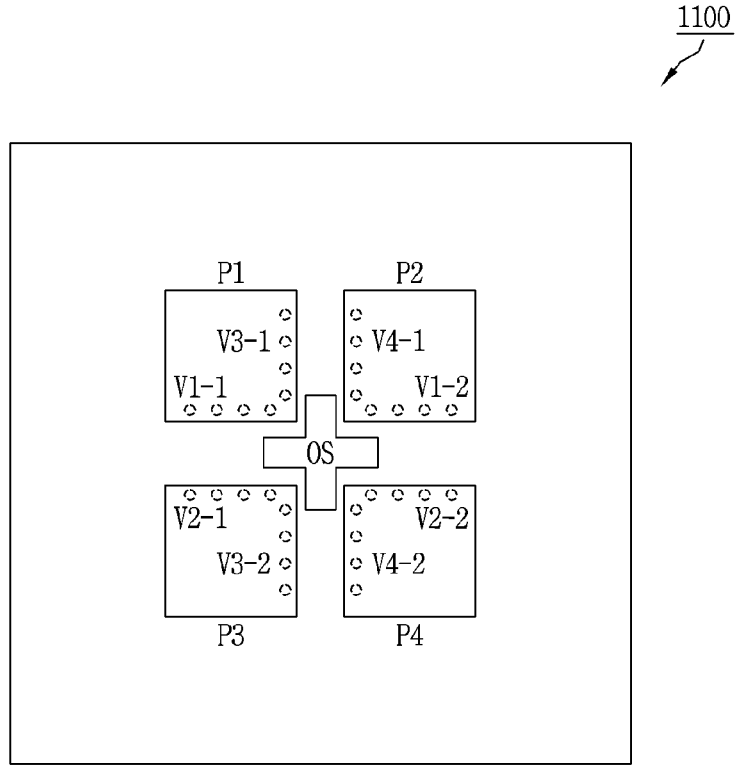
Figure 11C:
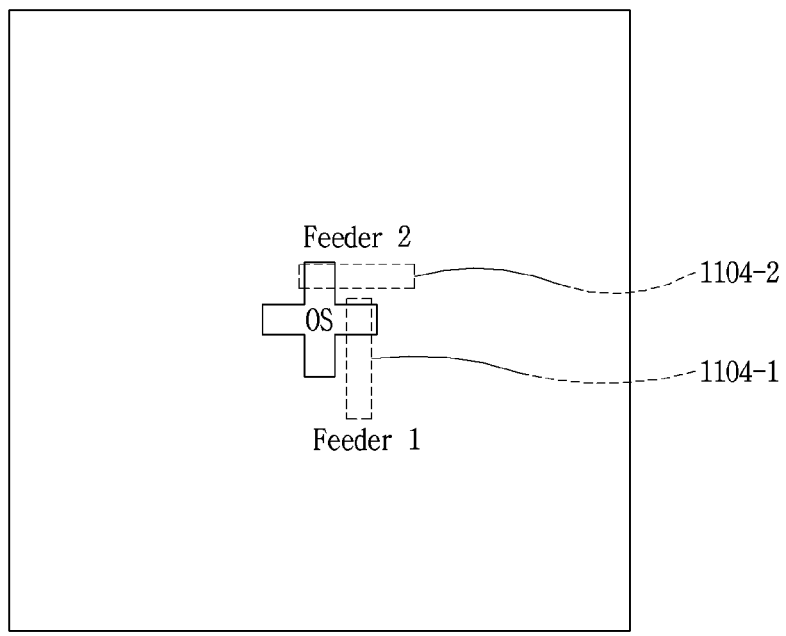
Figure 11D:
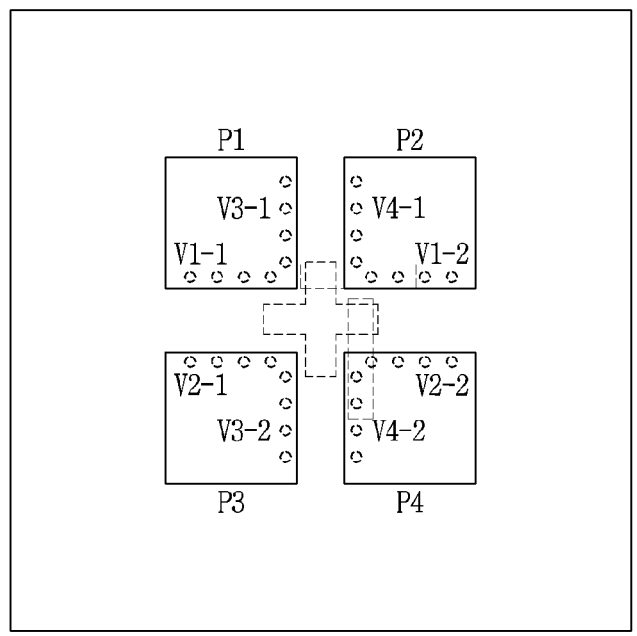

Specifically, FIG. 11A is an internal perspective view of a single antenna element having a dual feeding structure. FIG. 1B is a front view illustrating a patch antenna in which a plurality of vias are disposed and an orthogonal slot together in a single antenna element having a dual feeding structure. FIG. 11C is a front view illustrating an orthogonal slot and a double feeding structure together in a single antenna element having the dual feeding structure. FIG. 11D is a front view illustrating a patch antenna in which a plurality of vias are disposed, an orthogonal slot, and a dual feeding structure together in a single antenna element having the dual feed structure.

Referring to FIGS. 11A to 11D, the plurality of vias 1103 are defined along vertical and horizontal side surfaces in each of the first to fourth patches P1 to P4 adjacent to the orthogonal slot OS. Accordingly, each of the antenna elements may form a dual polarization.

Meanwhile, the structures of the orthogonal slot OS and the first and second feeding lines 1104-1 and 1104-2 according to the present disclosure are not limited to FIGS. 10A to 11D, and may be changed according to an application. In this regard, the first and second feeding lines 1104-1, 1104-2 may be disposed such that some lines overlap each other. In addition, the first and second feeding lines 1104-1, 1104-2 may be disposed in a state of being rotated by a predetermined angle, for example, substantially 45 degrees.

Similarly, the orthogonal slot OS may also be disposed in a state of being rotated by a predetermined angle, for example, substantially 45 degrees with respect to the first and second feeding lines 1104-1, 1104-2.

Figure 12:
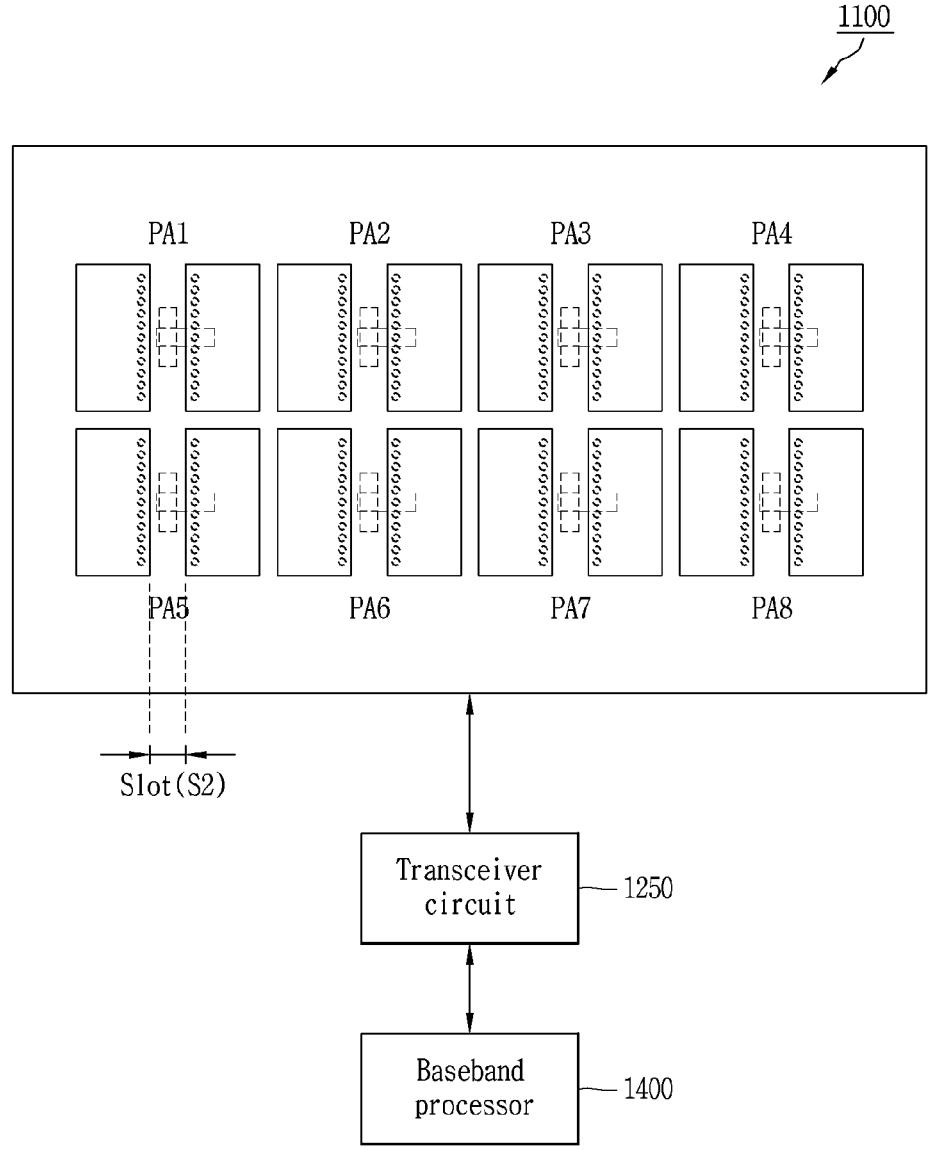
FIG. 12 shows an array antenna configuration in which a plurality of vias are disposed in a patch adjacent to a slot according to the present disclosure.

Meanwhile, a broadband antenna in which a plurality of vias are disposed inside a patch adjacent to a slot according to the present disclosure can be extended to an array antenna. In this regard, FIG. 12 shows an array antenna configuration in which a plurality of vias are disposed in a patch adjacent to a slot according to the present disclosure.

In this regard, a single antenna in which a plurality of vias are disposed inside a patch adjacent to a slot according to the present disclosure and an array antenna using the same have the following arrangement structure.

1) A horizontal/vertical size of a single antenna has a size of $0.5\lambda_0$ or less at the lowest frequency of the operating frequency.

In the present disclosure, $\lambda_0 = 5.3$ mm at the lowest frequency 57 GHz of the operating frequency. Meanwhile, as an example, a size of the single antenna may have a horizontal length=2.65 mm and a vertical length=2.4 mm. Accordingly, the size of the single antenna has a horizontal length=$0.5\lambda_0$ and a vertical length=$0.45\lambda_0$ based on the lowest frequency.

2) A spacing of the array antenna has a value between 0.5 and $0.8\lambda_0$ at the center frequency of the operating frequency.

In the present disclosure, $\lambda_0$=4.7 mm at the center frequency 63.7 GHz of the operating frequency. For an example, a spacing between the antenna elements in the array antenna has a horizontal spacing=$0.63\lambda_0$ and a vertical spacing=$0.53\lambda_0$.

On the other hand, referring to FIG. 12, the array antenna 1100 may include a two-dimensional array antenna in which a predetermined number of antenna elements are disposed in one axial direction and a predetermined number of antenna elements are disposed in the other axial direction.

Meanwhile, an array antenna in which a plurality of vias are disposed inside a patch adjacent to a slot according to the present disclosure may be applied with an electric band gap (EBG) structure, which is a periodic grating structure for improving radiation performance. In this regard, FIG. 13 shows array antenna configuration to which an electric band gap (EBG) structure, which is a periodic grating structure for improving radiation performance according to the present disclosure, is applied.

On the other hand, the characteristics of the array antenna according to the electric band gap (EBG) structure, which is a periodic grating structure for improving radiation performance according to the present disclosure, are as follows.

1) In the case of the present disclosure, when the EBGs are disposed on the left and right, the radiation performance of the array antenna can be improved.
2) The array antenna in a 60 GHz band to which the EBGs are added has a similar radiation pattern without distortion in a band from 57 GH to 70 GHz when checked for a used frequency band.
3) The maximum antenna gain for each frequency is 14.0 dBi at 57 GHz, 14.2 dBi at 61 GHz, 14.6 dBi at 65 GHz, and 14.4 dBi at 70 GHz. Therefore, it has a maximum antenna gain of 14.0 dBi or more in an entire band.

Figure 13:
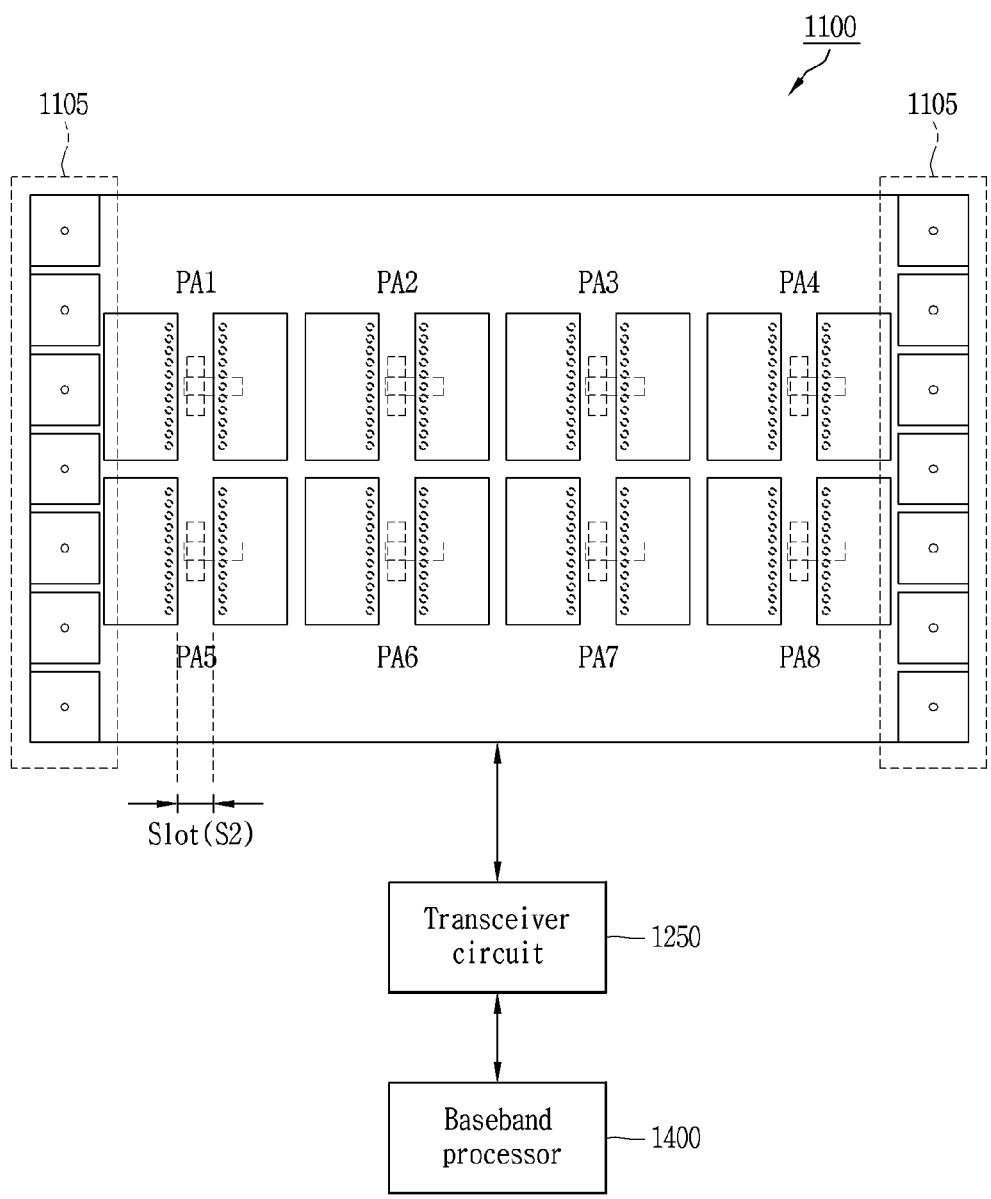
FIG. 13 shows array antenna configuration to which an electric band gap (EBG) structure, which is a periodic grating structure for improving radiation performance according to the present disclosure, is applied.

Referring to FIG. 13, a direction of the slot S1 is defined in the same direction in all antenna elements, and a plurality of electric band gap (EBG) structures 1105 may be arranged in a length direction of the slot S1. The plurality of EBG structures 1105 may be periodically arranged on the ground layer 1102 and a substrate on which the patch antenna 1101 is disposed in the multi-layer substrate. The efficiency of the array antenna 1100 may be improved by the plurality of EBG structures 1105.

Specifically, the plurality of EBG structures 1105 may be arranged in a one-dimensional structure on both side surfaces of the multi-layer substrate in a structure that is ground-connected to the substrate on which the patch antenna 1101 is disposed. In addition, a plurality of EBG vias 1106, which are connection structures disposed on the EBG structures 1105, may be arranged in parallel to the plurality of vias 1103 arranged in the patch antenna 1101 to improve antenna efficiency. The EBG structures 1105 in which the patch antenna 1101 disposed on an upper substrate and the ground layer 1102 disposed thereunder are connected to each other as described above may be referred to as mushroom EBGs.

Meanwhile, the antenna element in which a plurality of via structures are disposed inside the patch according to the present disclosure according to FIGS. 3 to 13 and an array antenna using the same can be controlled by the baseband processor 1400. In this regard, the baseband processor 1400 is connected to the transceiver circuit 1250 to control the transceiver circuit 1250 so as to perform beamforming and multi-input multi-output (MIMO) through a plurality of array antennas 1100*a* to 1100*d* disposed at different positions of the electronic device.

In this regard, the baseband processor 1400 may perform beamforming in different directions to radiate signals to dielectric regions defined in different directions through a first array antenna and a second array antenna among the plurality of array antennas.

In this regard, the different dielectric regions may be the dielectric region 1100B3 defined at an upper portion of the electronic device and a dielectric region defined at a lower portion of the electronic device. Therefore, different signals may be radiated in different directions through different dielectric regions by using the first and second array antennas according to the present disclosure at the same time. Accordingly, the baseband processor 1400 may use the first and second array antennas at the same time to radiate different signals in different directions through different dielectric regions, thereby improving an isolation between a plurality of MIMO streams.

In the above, a broadband antenna structure in which a plurality of via structures are arranged adjacent to a slot inside a patch according to an aspect of the present disclosure and an array antenna using the same have been described. Hereinafter, an electronic device including a processor that controls an array antenna configured with a plurality of via structures adjacent to a slot inside a patch according to another aspect of the present disclosure to radiate a signal through a case will be described. In this regard, the foregoing description of the broadband antenna structure and the array antenna using the same is also applicable to an electronic device including a processor that controls an array antenna to be described later to radiate a signal through a case.

Figure 14:
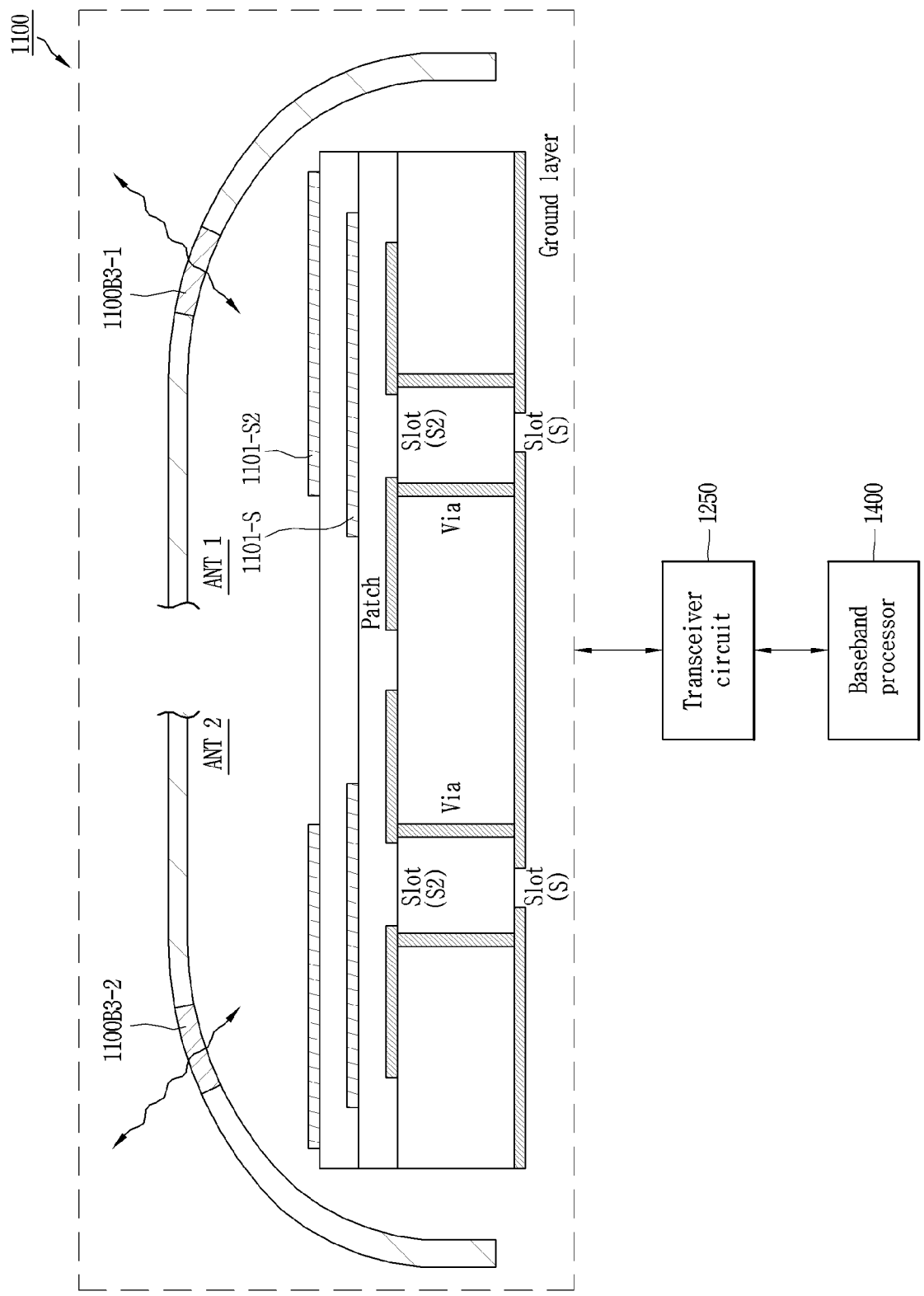
FIG. 14 shows a configuration of an electronic device having a processor that controls an array antenna disposed with a plurality of via structures according to the present disclosure to radiate signals through a case.

In this regard, FIG. 14 shows a configuration of an electronic device having a processor that controls an array antenna disposed with a plurality of via structures according to the present disclosure to radiate signals through a case.

Referring to FIGS. 3 to 14, the electronic device includes an array antenna 1100, a case 1100B corresponding to a body of the electronic device, and processors 1250, 1400. Here, the processors 1250, 1400 include an RFIC corresponding to the transceiver circuit 1250 and the baseband processor 1400.

The array antenna 1100 is implemented as a multi-layer substrate inside the electronic device, and is configured to include a plurality of antenna elements. Meanwhile, the case 1100B defines a body of the electronic device and includes a dielectric region to allow a signal through the array antenna 1100 to be radiated to the outside. Furthermore, the processors 1250, 1400 are configured to control a signal applied to each antenna element of the array antenna 1100 to perform beamforming through the array antenna 1100.

Meanwhile, each antenna element of the array antenna 1100 may be configured to include the patch antenna 1101 and the ground layer 1102. In addition, each antenna element of the array antenna 1100 may be configured to further include a feeding line 1104.

Specifically, the patch antenna 1101 is disposed on a specific layer of the multi-layer substrate, and is configured to include the first and second patches P1 and P2 spaced apart from each other by a predetermined spacing. However, the present disclosure is not limited thereto, and may be configured to include the first to fourth patches P1 to P4 spaced apart from each other at predetermined intervals in horizontal and vertical directions in order to implement a dual polarization.

Meanwhile, the ground layer 1102 is disposed under the patch antenna, and can be configured to include a slot S, OS. Accordingly, the first patch P1 and the second patch P2 may be connected to the ground layer 1102 and the plurality of vias 1103, and the plurality of vias 1103 may be disposed in a length direction of the slot S to be adjacent to the slot S.

Meanwhile, a feeding line 1104 is disposed under the ground layer 1102 and is configured to transmit a signal to the patch antenna 1101 through the slot S, OS. In this regard, the first signal of the first frequency band may form a magnetic field through the second slot S2 between the first patch P1 and the second patch P2 through the feeding line 1104 and the plurality of vias 1103. In addition, a second signal of the second frequency band may be coupled to the patch antenna 1101 through the feeding line 1104 and the slot S to form an electric field on the patch antenna 1101.

Meanwhile, the case 1100B according to the present disclosure defines a body of the electronic device, and includes a dielectric region 1100B3 to allow a signal through the array antenna 1100 to be radiated to the outside. Furthermore, the processors 1250, 1400 are configured to control a signal applied to each antenna element of the array antenna 1100 to perform beamforming through the array antenna 1100.

In this regard, the first and second signals may be radiated to first and second dielectric regions 1100B3-1, 1100B3-2 through a first array antenna ANT1 disposed at one side inside the electronic device and a second array antenna ANT2 disposed at the other side. For an example, the first and second signals may be radiated to first and second dielectric regions 1100B3-1, 1100B3-2 at front and lower portion of the electronic device through the first array antenna ANT1 disposed at one side inside the electronic device and the second array antenna ANT2 disposed at the other side.

As described above, there is an advantage capable of performing multi-input multi-output (MIMO) while maintaining an isolation between a plurality of different signals by utilizing two to four side, front, or rear surfaces of the electronic device. In particular, the at least one parasitic patch 1101-S, 1101-S2 may be offset compared to the patch antenna 1101 to allow the beam direction to be tilted from the boresight. Accordingly, the first and second signals may be radiated to the first and second dielectric regions 1100B3-1, 1100B3-2. Accordingly, there is an advantage in that a signal can be radiated from a structure of the case 1100B, which is not easy to radiate the signal to an outside of the electronic device due to a metal case or a display structure.

Meanwhile, the plurality of vias 1103 according to the present disclosure may be configured to include a plurality of first vias V1 and a plurality of second vias V2. The plurality of first vias V1 may be disposed at predetermined intervals on one side surface of the first patch P1 to connect the one side surface of the first patch P1 and the ground layer 1102. Furthermore, the plurality of second vias V2 may be disposed at predetermined intervals on the other side surface of the second patch P2 facing the one side surface of the first patch P1 to the other side surface of the second patch P2 to connect the ground layer 1102.

On the other hand, the RFIC (Radio Frequency Integrated Chip) 1250, which is a processor, is connected to the feeding line 1104 in the form of bumping under the feeding line 1104 to transmit a millimeter wave band signal between the RFIC 1250 and the feeding line 1104.

Specifically, the RFIC 1250 may be connected to the feeding line 1104 and configured to transmit a phase-changed signal to each antenna element of the array antenna 1100. Furthermore, the baseband processor 1400 may be connected to the RFIC 1250 to control the RFIC 1250 so as to perform beamforming and multi-input multi-output (MIMO) through the plurality of array antennas 1100a to 1100d disposed at different positions of the electronic device.

To this end, the baseband processor 1400 may perform beamforming in different directions to radiate signals to dielectric regions 1100B3-1, 1100B3-2 defined in different directions through the first array antenna ANT1 and the second array antenna ANT2 among the plurality of array antennas. Accordingly, an isolation between the plurality of MIMO streams through the first array antenna ANT1 and the second array antenna ANT2 may be improved.

In the above, an electronic device having a 5G/6G antenna operable in a millimeter wave band according to the present disclosure has been described. The technical effects of an electronic device having a 5G/6G antenna operable in such a millimeter wave band will be described as follows.

An aspect of the present disclosure is to improve the radiation performance of a 5G antenna through the antenna with a multi-layer substrate structure, a via in a slot region, and an EBG structure in an electronic device having a 5G/6G antenna operating in a millimeter wave band.

Furthermore, another aspect of the present disclosure is to achieve the broadband characteristics of a 5G antenna by having the characteristics of both a slot antenna and a patch antenna using vias in the electronic device having the 5G/6G antenna operating in a millimeter wave band.

Still another aspect of the present disclosure is to radiate a signal to an outside of the electronic device through a non-metal region through an antenna by adjusting the position of a parasitic patch in the electronic device having the 5G/6G antenna operating in a millimeter wave band.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

With regard to the foregoing present disclosure, the design of a 5G/6G antenna capable of operating in a millimeter wave band and the control of a plurality of 5G/6G array antennas can be implemented as computer readable codes on a medium on which a program is recorded. The computer-readable medium may include all types of recording devices each storing data readable by a computer system. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controllers 180, 1250, 1400 of the terminal. Therefore, it should also be understood that the above-described embodiments are not limited by any of the details of the foregoing description, unless otherwise specified, but rather should be construed broadly within its scope as defined in the appended claims. The scope of the invention should be determined by reasonable interpretation of the appended claims and all changes that come within the equivalent scope of the invention are included in the scope of the invention.

The invention claimed is:

1. An electronic device having an antenna, the electronic device comprising:
   an array antenna implemented as a multi-layer substrate inside the electronic device, the array antenna comprising a plurality of antenna elements; and
   a transceiver circuit that controls a signal applied to each antenna element of the array antenna to perform beamforming through the array antenna,
   wherein each of the antenna elements comprises:
   a patch antenna disposed on a specific layer of the multi-layer substrate, the patch antenna comprising a first patch and a second patch spaced apart from each other by a predetermined spacing; and
   a ground layer disposed under the patch antenna, the ground layer having a slot, and
   wherein the first patch and the second patch are connected to the ground layer through a plurality of vias, and the plurality of vias are disposed in a length direction of the slot to be adjacent to the slot.

2. The electronic device of claim 1, wherein each of the antenna elements operates as a magnetic dipole type slot antenna by a magnetic field formed in a second slot between the first patch and the second patch in a first frequency band, and
   operates as an electric dipole type patch antenna by the first patch and the second patch in a second frequency band different from the first frequency band.

3. The electronic device of claim 1, wherein the plurality of vias comprise:
   a plurality of first vias disposed at predetermined intervals on one side surface of the first patch to connect the one side surface of the first patch and the ground layer; and
   a plurality of second vias disposed at predetermined intervals on one side surface of the first patch to connect the ground layer and the other side surface of the second patch facing the one side surface of the first patch.

4. The electronic device of claim 1, further comprising:
   a feeding line disposed under the ground layer, and configured to transmit a signal to the patch antenna through the slot,
   wherein a first signal of a first frequency band forms a magnetic field through a second slot between the first patch and the second patch through the feeding line and the plurality of vias, and
   wherein a second signal of a second frequency band is coupled to the patch antenna through the feeding line and the slot to form an electric field on the patch antenna.

5. The electronic device of claim 1, wherein a radio frequency integrated chip (RFIC), which is the transceiver circuit, is connected to a feeding line in the form of bumping under the feeding line to transmit a millimeter wave band signal between the RFIC and the feeding line.

6. The electronic device of claim 1, further comprising:
   a parasitic patch disposed on a substrate above the patch antenna to extend an operating bandwidth of the antenna element,
   wherein as the center of the parasitic patch is offset compared to the center of the patch antenna, a beam peak of the antenna element is tilted by a first angle from the boresight.

7. The electronic device of claim 6, further comprising:
   a second parasitic patch disposed above the parasitic patch to further extend the operating bandwidth of the antenna element,
   wherein as the center of the second parasitic patch is offset compared to the center of the parasitic patch, the beam peak of the antenna element is tilted by a second angle greater than the first angle from the boresight.

8. The electronic device of claim 6, wherein the multi-layer substrate is disposed inside a body of the electronic device, and
   wherein the body comprises:
   a metal region defined at a side surface portion of the electronic device, and disposed to disallow a signal radiated from the antenna element to pass therethrough;
   an un-transparent region defined at a front or rear surface portion of the electronic device to disallow a signal radiated from the antenna element to pass therethrough; and
   a dielectric region defined between a side metal region and the un-transparent region and disposed to allow a signal radiated from the antenna element to pass therethrough.

9. The electronic device of claim 1, wherein the array antenna is configured as a one-dimensional array antenna such that a predetermined number of antenna elements are disposed in one axial direction to perform beamforming in the one axial direction, and
   wherein a beam-formed signal is radiated from the array antenna to the outside through a curved dielectric region defined in the body of the electronic device.

10. The electronic device of claim 1, wherein the array antenna is configured as a two-dimensional array antenna in which a predetermined number of antenna elements are disposed in one axial direction and a predetermined number of antenna elements are disposed in the other axial direction,
    wherein a beam-formed signal is radiated from the array antenna to the outside through a curved second dielectric region defined in the body of the electronic device, and
    wherein a width of the second dielectric region is disposed to be narrower than that of the dielectric region due to the directivity of the two-dimensional array antenna in the other axial direction.

11. The electronic device of claim 1, wherein the patch antenna comprises first to fourth patches spaced apart in one axial direction and the other axial direction,
    wherein the ground layer has an orthogonal slot disposed to be orthogonal to the one axial direction and the other axial direction, and
    wherein the plurality of vias are disposed along vertical and horizontal side surfaces in each of the first to fourth patches adjacent to the orthogonal slot such that each of the antenna elements forms a dual polarization.

12. The electronic device of claim 11, further comprising:
    a first feeding line disposed in parallel to a vertical slot of the orthogonal slot under the ground; and a second feeding line disposed in parallel to a horizontal slot of the orthogonal slot under the ground,
    wherein the each of the antenna elements generates a vertically polarized signal by a first signal from the first feeding line, and
    wherein the each of the antenna elements generates a horizontally polarized signal by a second signal from the second feeding line.

13. The electronic device of claim 1, wherein the array antenna is configured as a two-dimensional array antenna in which a predetermined number of antenna elements are disposed in one axial direction and a predetermined number of antenna elements are disposed in the other axial direction, and wherein a direction of the slot is defined in the same direction for all antenna elements, and a plurality of electric band gap (EBG) structures are periodically disposed on the ground and a substrate on which the patch antenna is disposed in the multi-layer substrate in a length direction of the slot so as to improve the efficiency of the array antenna.

14. The electronic device of claim 13, wherein the plurality of EBG structures are disposed in a one-dimensional structure on both side surfaces of the multi-layer substrate in a structure ground-connected to the substrate on which the patch antenna is disposed, and a plurality of EBG vias, which are connection structures disposed on the EBG structures, are arranged in parallel to the plurality of vias arranged in the patch antenna to improve antenna efficiency.

15. The electronic device of claim 1, further comprising:
a baseband processor connected to the transceiver circuit and configured to control the transceiver circuit so as to perform beamforming and multi-input multi-output (MIMO) through a plurality of array antennas disposed at different positions of the electronic device,
wherein the baseband processor performs beamforming in different directions to radiate signals to dielectric regions defined in different directions through a first array antenna and a second array antenna among the plurality of array antennas so as to improve an isolation between a plurality of MIMO streams.

16. An electronic device having an antenna, the electronic device comprising:
an array antenna implemented as a multi-layer substrate inside the electronic device, the array antenna comprising a plurality of antenna elements;
a case constituting a body of the electronic device and having a dielectric region to allow a signal through the array antenna to be radiated to the outside; and
a processor that controls a signal applied to each antenna element of the array antenna to perform beamforming through the array antenna,
wherein each of the antenna elements comprises:
a patch antenna disposed on a specific layer of the multi-layer substrate, the patch antenna comprising a first patch and a second patch spaced apart from each other by a predetermined spacing; and
a ground layer disposed under the patch antenna, the ground layer having a slot, and wherein the first patch and the second patch are connected to the ground layer through a plurality of vias, and the plurality of vias are disposed in a length direction of the slot to be adjacent to the slot.

17. The electronic device of claim 16, wherein the plurality of vias comprise:
a plurality of first vias disposed at predetermined intervals on one side surface of the first patch to connect the one side surface of the first patch and the ground layer; and
a plurality of second vias disposed at predetermined intervals on one side surface of the first patch to connect the ground layer and the other side surface of the second patch facing the one side surface of the first patch.

18. The electronic device of claim 16, further comprising:
a feeding line disposed under the ground layer, and configured to transmit a signal to the patch antenna through the slot,
wherein a first signal of a first frequency band forms a magnetic field through a second slot between the first patch and the second patch through the feeding line and the plurality of vias, and
wherein a second signal of a second frequency band is coupled to the patch antenna through the feeding line and the slot to form an electric field on the patch antenna.

19. The electronic device of claim 16, wherein a radio frequency integrated chip (RFIC), which is the processor, is connected to a feeding line in the form of bumping under the feeding line to transmit a millimeter wave band signal between the RFIC and the feeding line.

20. The electronic device of claim 16, wherein the processor comprises:
an RFIC connected to the feeding line and configured to transmit a phase-changed signal to each of the antenna elements; and
a baseband processor connected to the RFIC and configured to control the RFIC so as to perform beamforming and multi-input multi-output (MIMO) through a plurality of array antennas disposed at different positions of the electronic device, and
wherein the baseband processor performs beamforming in different directions to radiate signals to dielectric regions defined in different directions through a first array antenna and a second array antenna among the plurality of array antennas so as to improve an isolation between a plurality of MIMO streams.

* * * * *